Oct. 27, 1942.  W. B. EDDISON  2,300,354
UNBALANCE CORRECTION METHOD AND MACHINE
Filed June 24, 1939   14 Sheets-Sheet 1

INVENTOR
WILLIAM BARTON EDDISON
BY
Fred G. Parsons
ATTORNEY

Oct. 27, 1942.                    W. B. EDDISON                         2,300,354
                        UNBALANCE CORRECTION METHOD AND MACHINE
                              Filed June 24, 1939           14 Sheets-Sheet 2
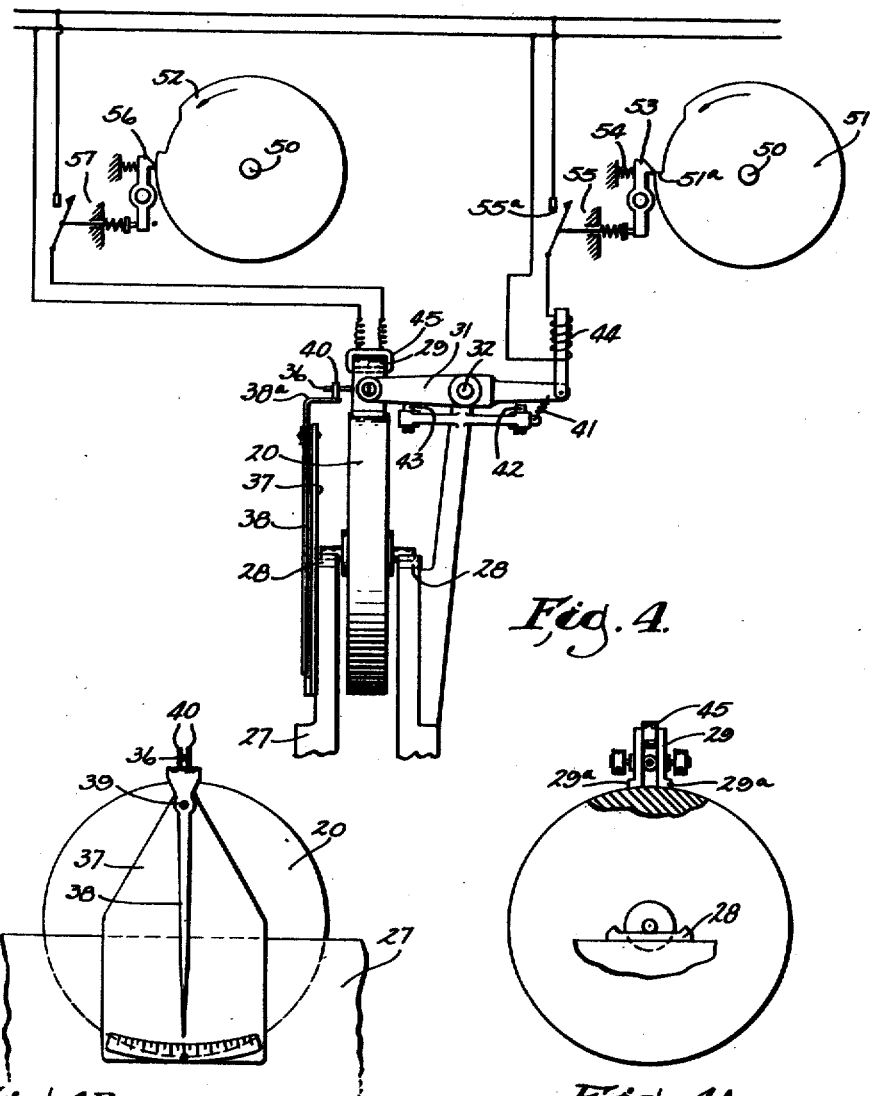

INVENTOR
WILLIAM BARTON EDDISON
BY Fred G. Parsons
ATTORNEY

Oct. 27, 1942.  W. B. EDDISON  2,300,354
UNBALANCE CORRECTION METHOD AND MACHINE
Filed June 24, 1939  14 Sheets-Sheet 5

INVENTOR
WILLIAM BARTON EDDISON

BY
Fred G Parsons
ATTORNEY

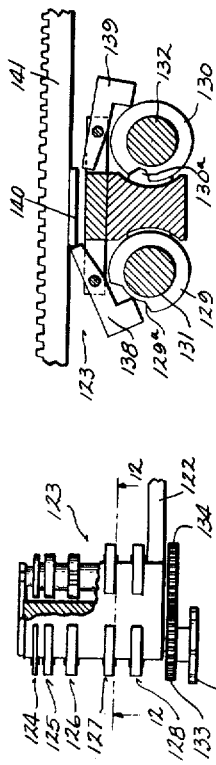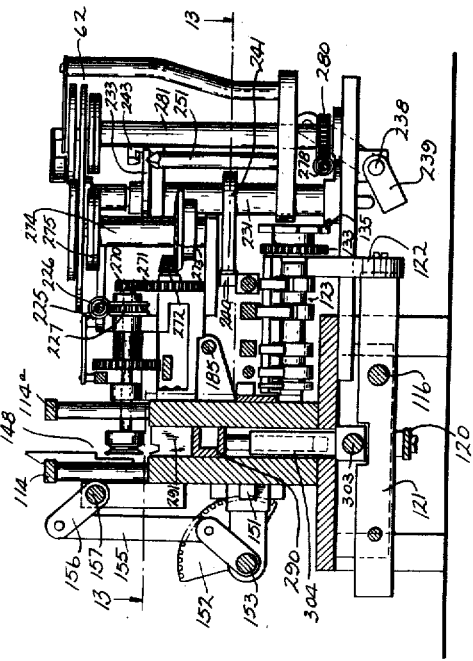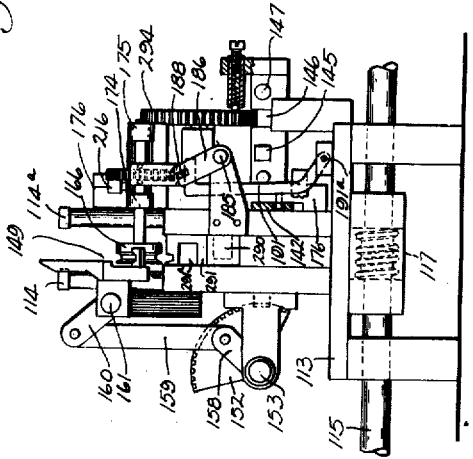

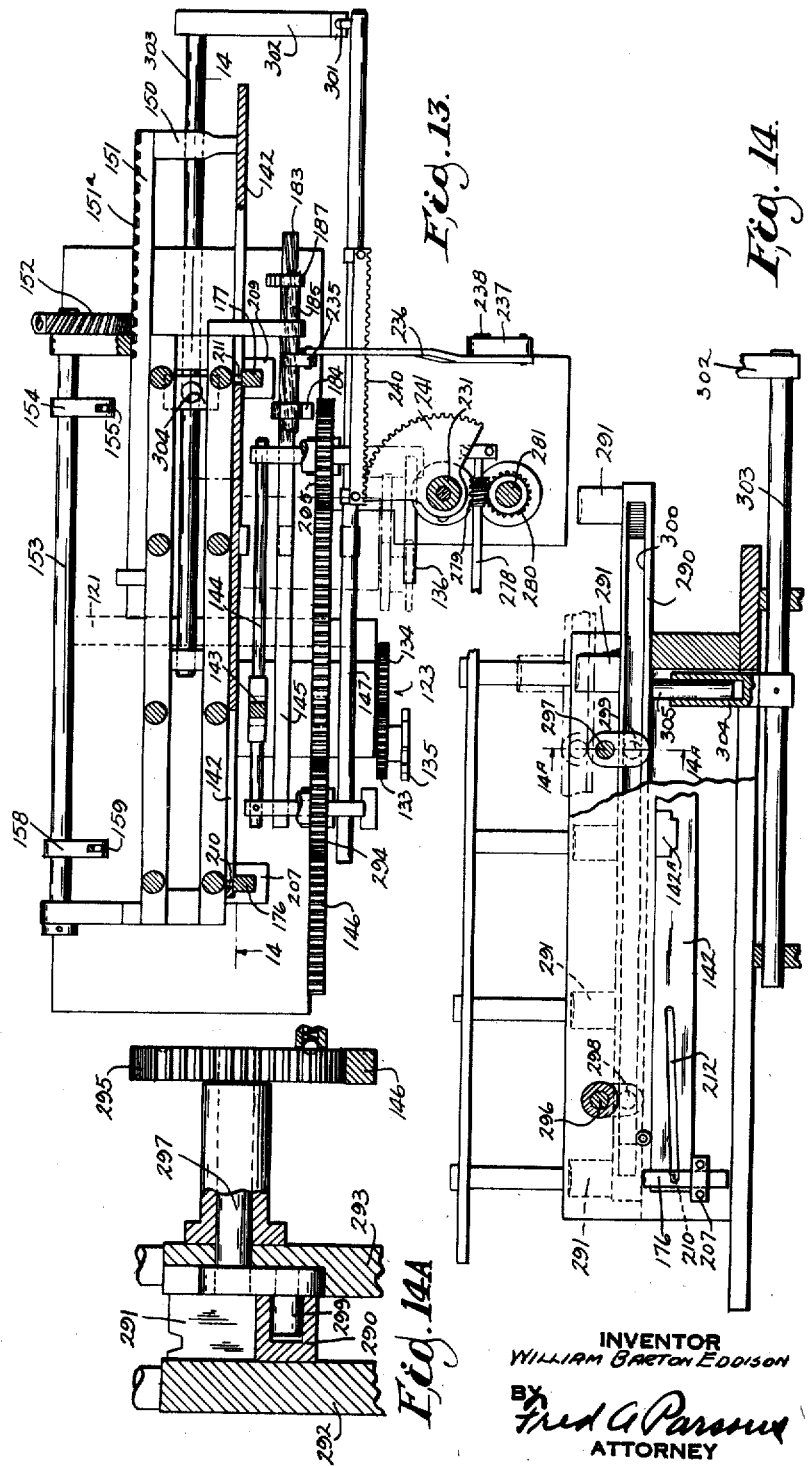

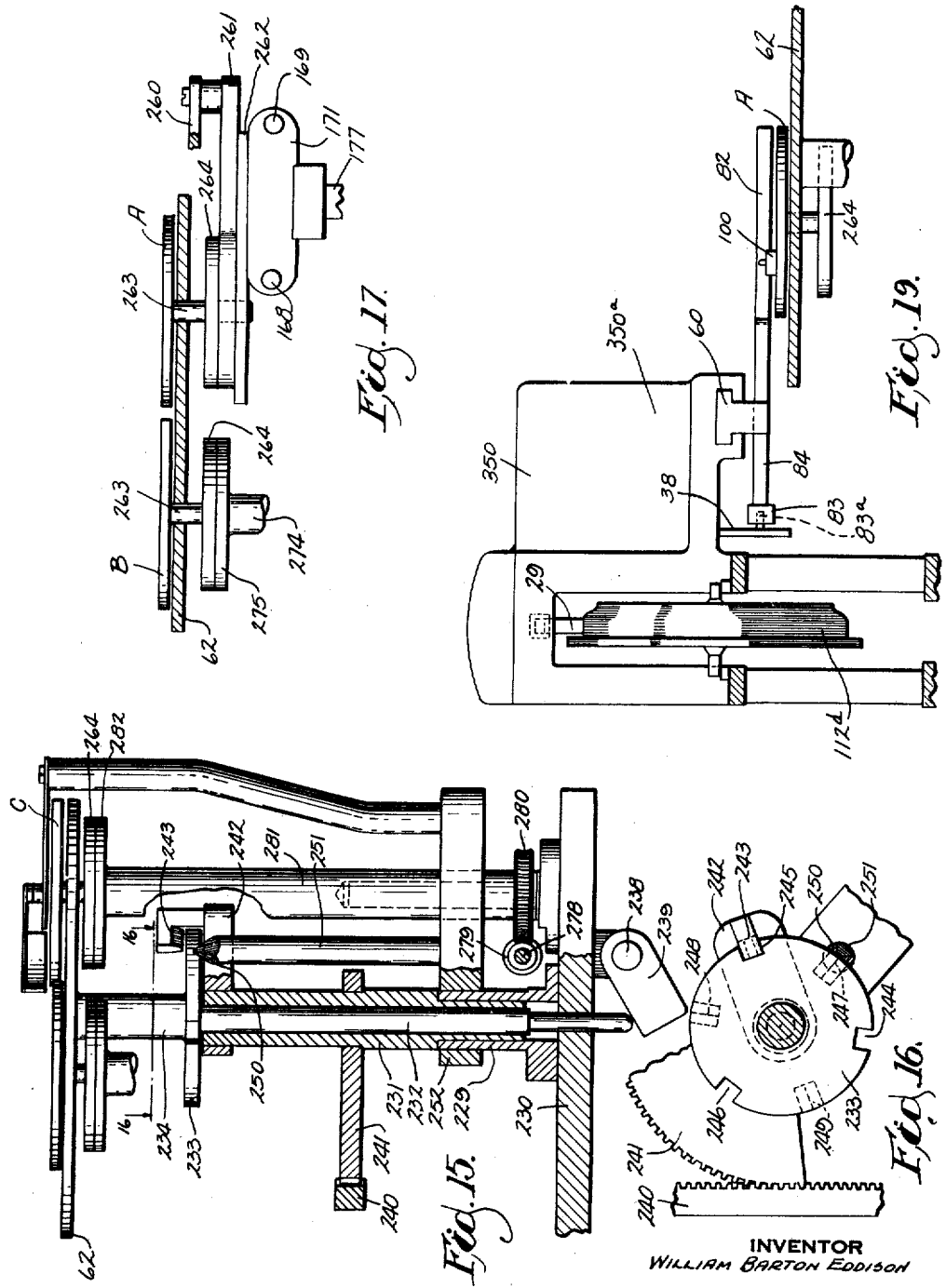

Oct. 27, 1942. W. B. EDDISON 2,300,354
UNBALANCE CORRECTION METHOD AND MACHINE
Filed June 24, 1939 14 Sheets-Sheet 11

INVENTOR
WILLIAM BARTON EDDISON
BY Fred G. Parsons
ATTORNEY

Oct. 27, 1942.  W. B. EDDISON  2,300,354
UNBALANCE CORRECTION METHOD AND MACHINE
Filed June 24, 1939  14 Sheets-Sheet 14
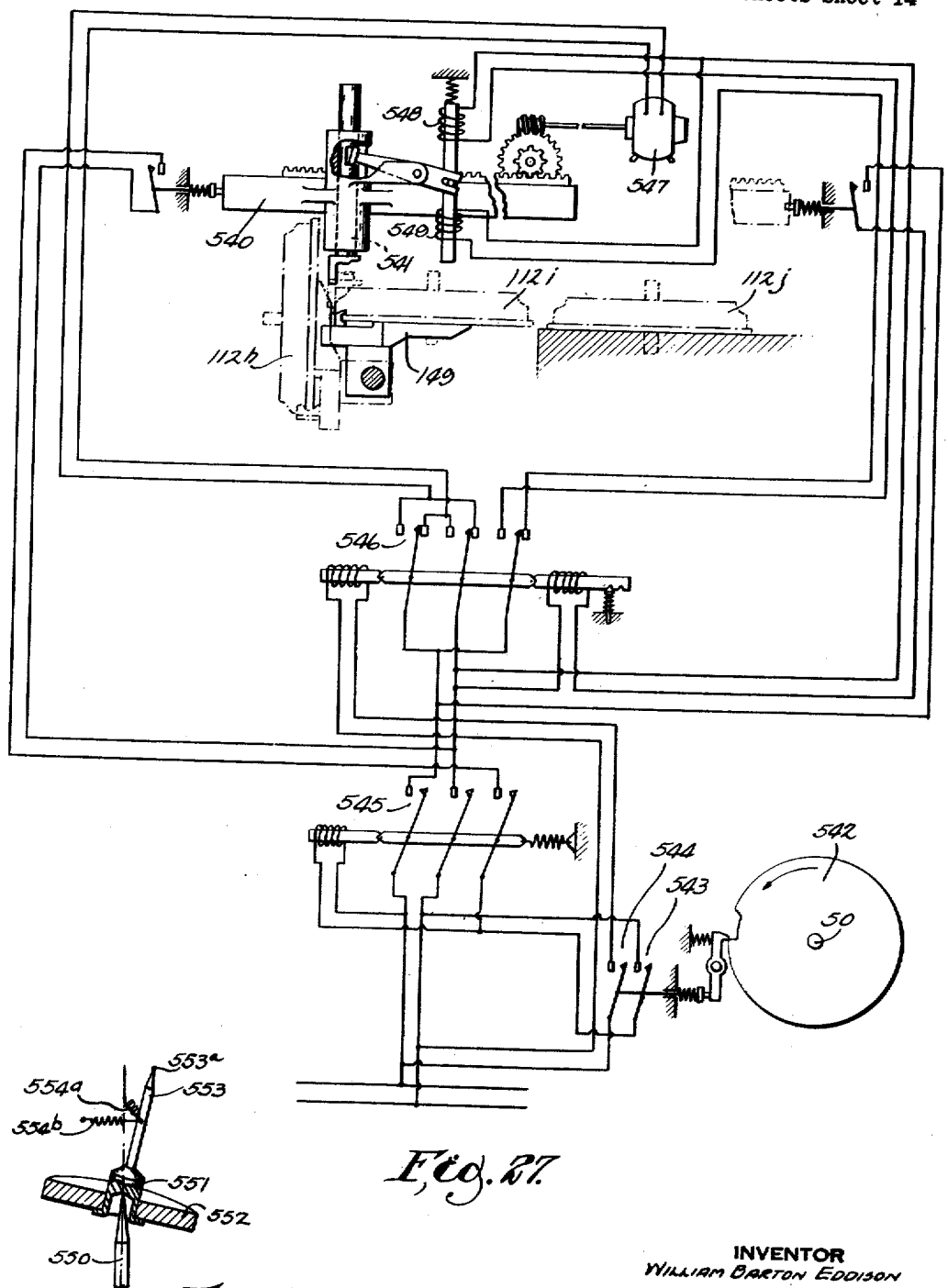
INVENTOR
WILLIAM BARTON EDDISON
BY
Fred G Parsons
ATTORNEY Patented Oct. 27, 1942

2,300,354

UNITED STATES PATENT OFFICE 2,300,354

UNBALANCE CORRECTION METHOD AND MACHINE

William Barton Eddison, Irvington, N. Y.

Application June 24, 1939, Serial No. 280,907

22 Claims. (Cl. 77—5)

This invention relates to correction of unbalance in work pieces, particularly for such correction about an intended axis of rotation, and especially for relatively heavy parts such, for example, as engine fly wheels.

A purpose of the invention is to provide a method or methods for balancing unbalanced work pieces, particularly adapted to be applied in whole or in part in various types of automatic or semi-automatic machines to effect improved accuracy or production, or a minimum of operator's attention, or all of these improvements, during a balancing operation.

A further purpose is to provide means, such as machine units for carrying out individual steps of a balancing operation, or such as a machine for carrying out a series of such steps, and particularly for automatic or semi-automatic operation.

A further purpose is to simplify and improve the method of balancing unbalanced work pieces.

A further purpose is to simplify and improve the construction, operation and relationship of parts of machines for balancing or of individual units of such machines.

Still other objects will be apparent from this specification of the invention, it being understood that the invention includes the specific methods and structures herein illustrated, described and claimed and such other methods and structures as are equivalent to the methods or structures of the claims.

The same reference characters have been used for the same parts throughout, and in the drawings:

Figure 4 is a semi-diagrammatic illustration of a device for measuring unbalance in a work piece with the intended axis of rotation horizontal.

Figures 4A, 4B show portions of the device of Fig. 4, viewed from the left.

Figure 4C is a horizontal section, enlarged, of a portion of the mechanism shown in Fig. 4.

Figure 7:
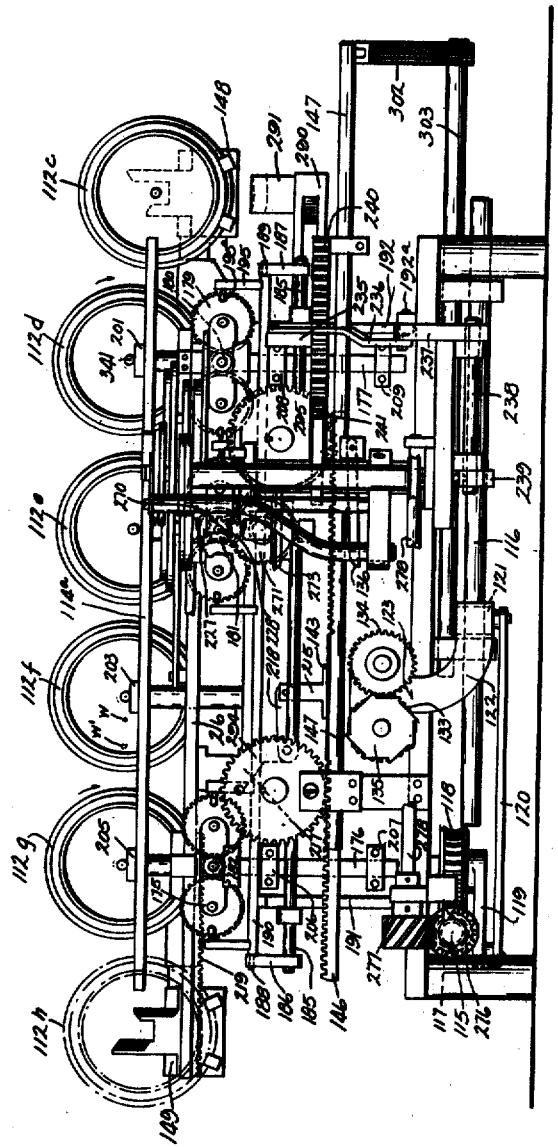
Figure 6:
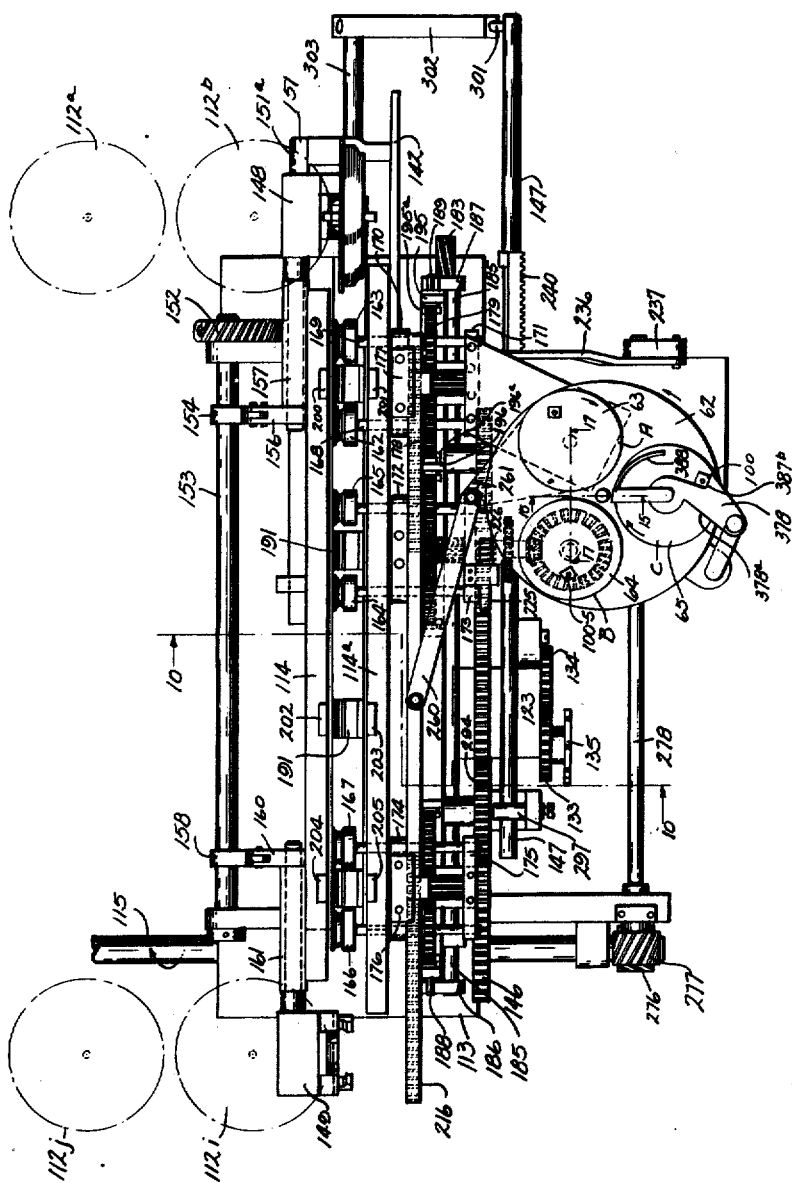

Figure 7 is a front elevation of a machine for automatically positioning work pieces in a series of positions for successive steps of an automatic balancing operation, where the balancing is effected with the work piece in position for its intended axis of rotation to be horizontal, as in Fig. 4. Various units used in combination with the machine to carry out the improved methods of the invention have been removed to better show the mechanism of the machine.

Figure 8 is a plan view of the machine of Fig. 7.

Figure 9 is an end elevation of the machine of Figs. 7, 8, viewed from the left in Fig. 7, some of the machine structure being removed.

Figure 10 is a partial vertical section of the machine of Figs. 7, 8, taken approximately along line 10—10 of Fig. 8.

Figure 11 is a plan view partly broken away of a timer unit of the machine of Figs. 7, 8.

Figure 12 is an enlarged sectional view of the same unit, taken along line 12—12 of Fig. 11.

Figure 13 is a horizontal section, showing some of the mechanism of the machine of Figs. 7, 8, taken approximately along line 13—13 of Fig. 10.

Figure 14 is a fragmentary vertical section, showing some of the mechanism of the machine of Figs. 7, 8, taken approximately along line 14—14 of Fig. 13.

Figure 14A is a vertical enlarged section taken along line 14A—14A of Fig. 14, and showing some associated parts.

Figure 15 is an enlarged view of some of the mechanism of the machine of Figs. 7, 8, partly in vertical section taken approximately along line 15—15 of Fig. 8.

Figure 16 is a partial horizontal section taken along line 16—16 of Fig. 15.

Figure 17 is a partial vertical section of mechanism shown in Fig. 15, and associated mechanism, taken along line 17—17 of Fig. 8.

Figure 18:
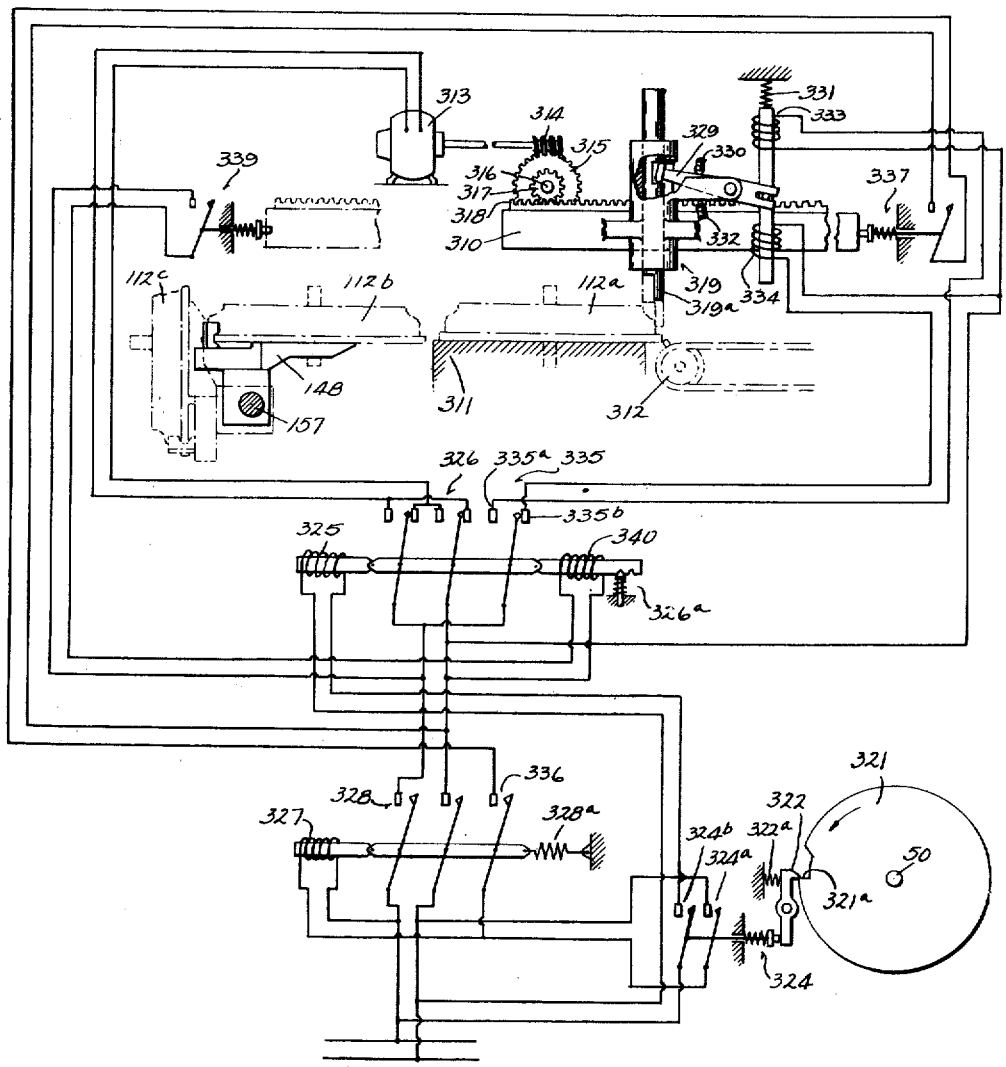

Figure 18 is a semi-diagrammatic view of the arrangement and operating relationship of parts of an initial work loading unit used with the machine of Figs. 7, 8.

Figure 5:
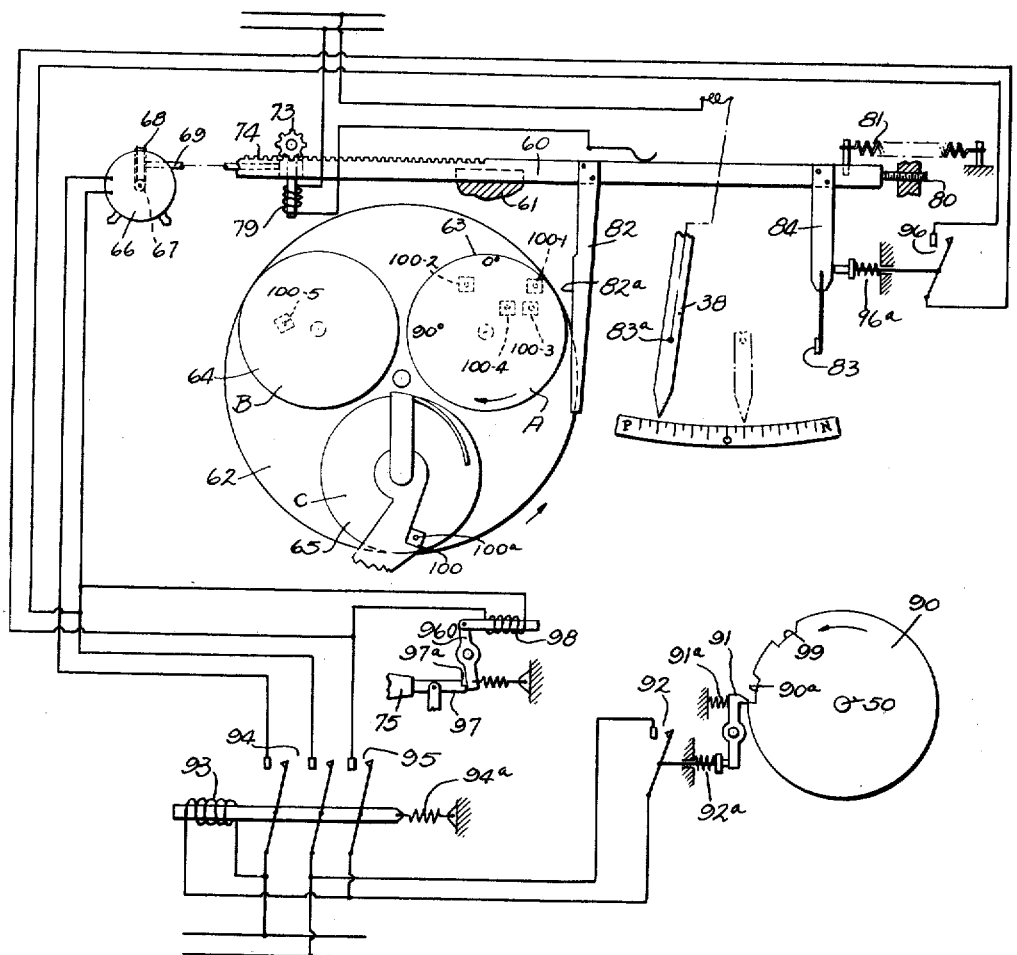
Figure 5 is a diagram showing the operating relationship of parts of a unit for effecting a mechanical pattern of such unbalance as may be present in a work piece.

Figure 19 is a semi-diagrammatic partial elevation of one of the units fixed on the machine of Figs. 7, 8 and incorporating in this instance the essentials of the device of Fig. 5 for effecting a mechanical pattern of unbalance. The unit and the machine portions are shown as they appear from the left of the machine, other units being removed.

Figure 20:
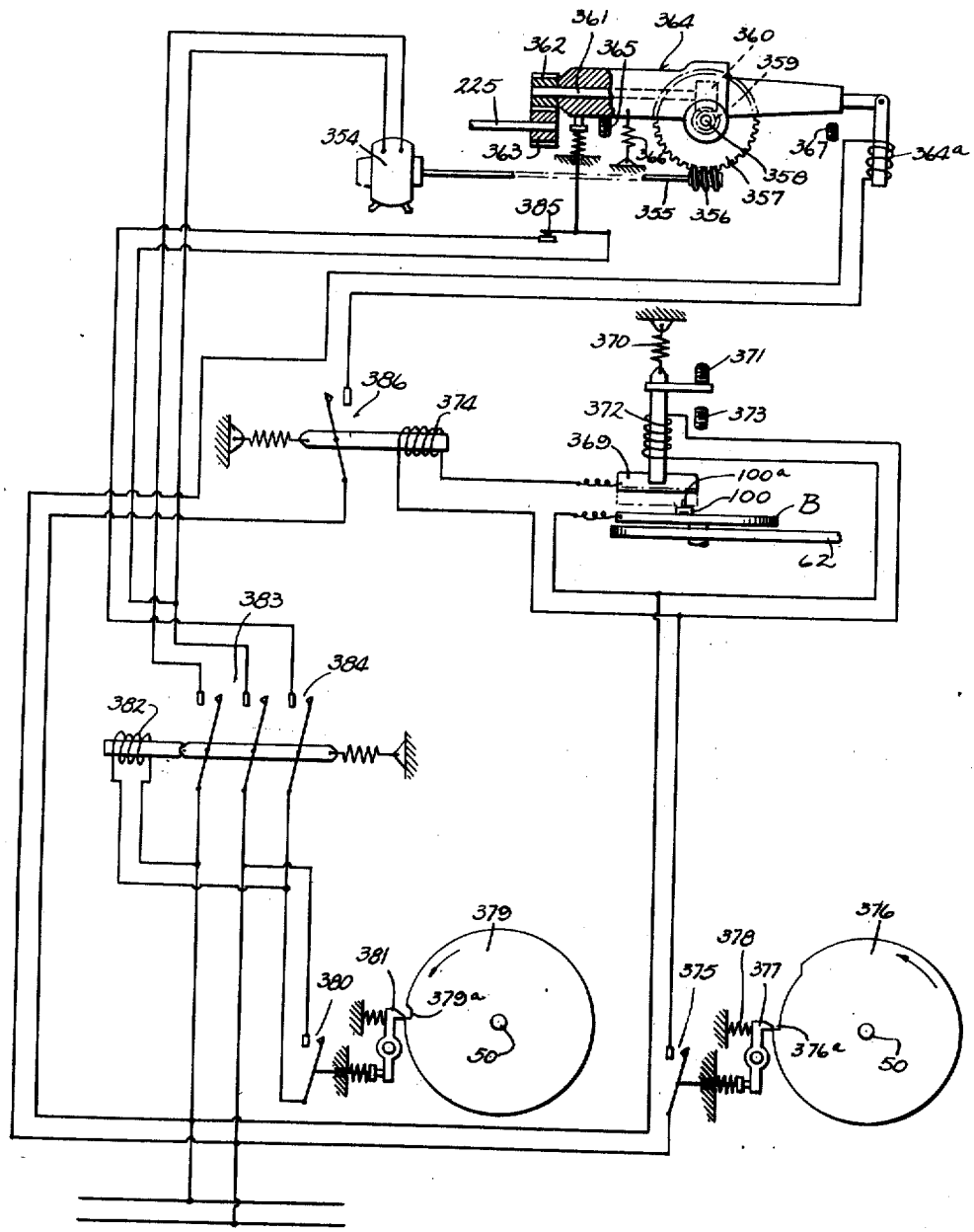

Figure 20 is a semi-diagrammatic representation showing operating relationship of parts of a unit used on the machine of Figs. 7, 8 for utilizing the mechanical pattern of unbalance effected by the unit of Figs. 5 and 19.

Figures 21, 22:
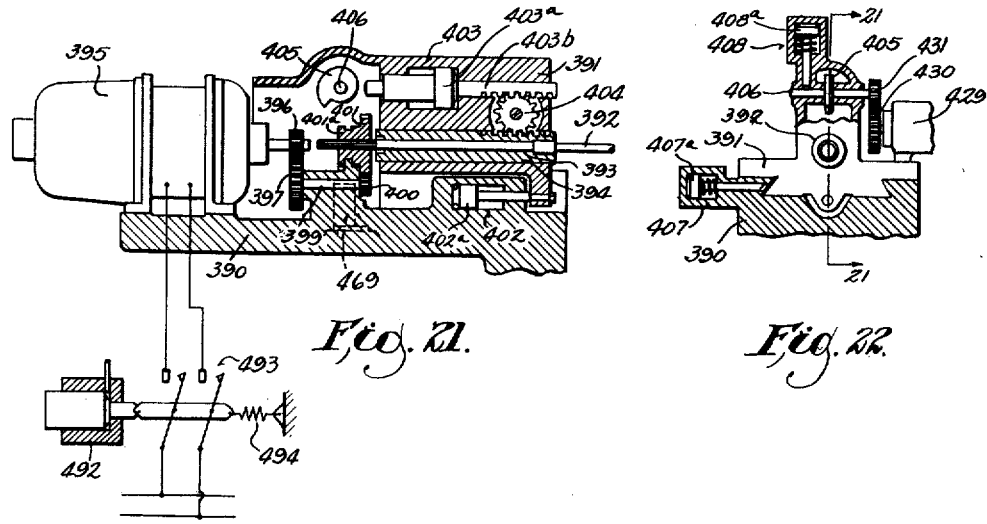

Figure 21 is a vertical section of a driller unit used with the machine of Figs. 7, 8, taken approximately along line 21—21 of Fig. 22, and diagrammatically showing some of the control mechanism.

Figure 22 is a front elevation of the driller unit of Fig. 21.

Figure 23:
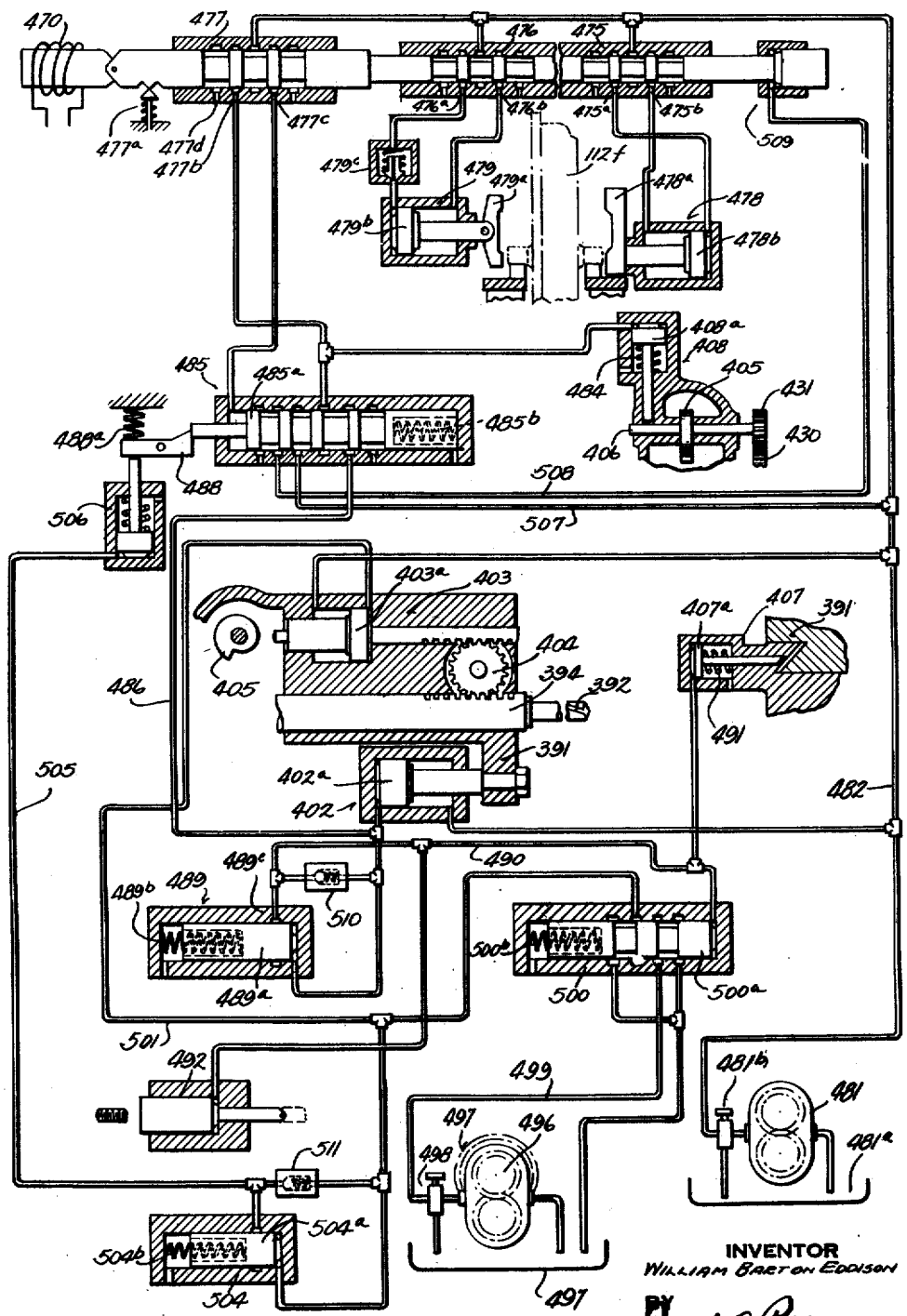

Figure 23 is a diagram showing the operating relationship of the control mechanism of the driller unit of Figs. 21, 22, together with its relation to the operating mechanism of a work supporting and clamping device used with the driller unit.

Figures 24, 26:
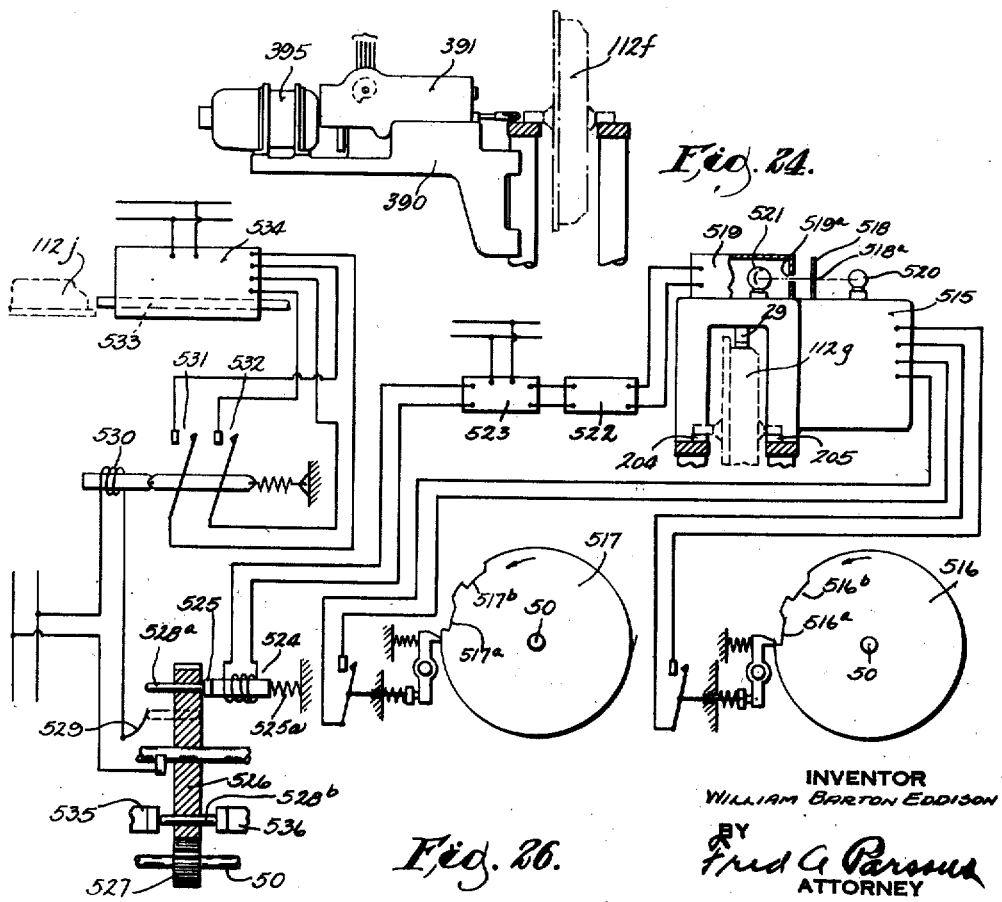

Figure 24 is a reduced size diagram showing an end elevation of the driller unit of Figs. 21, 22, 23 in operating position on the frame of the machine of Figs. 7, 8, as viewed from the left of Fig. 8, other units being removed.

Figure 25:
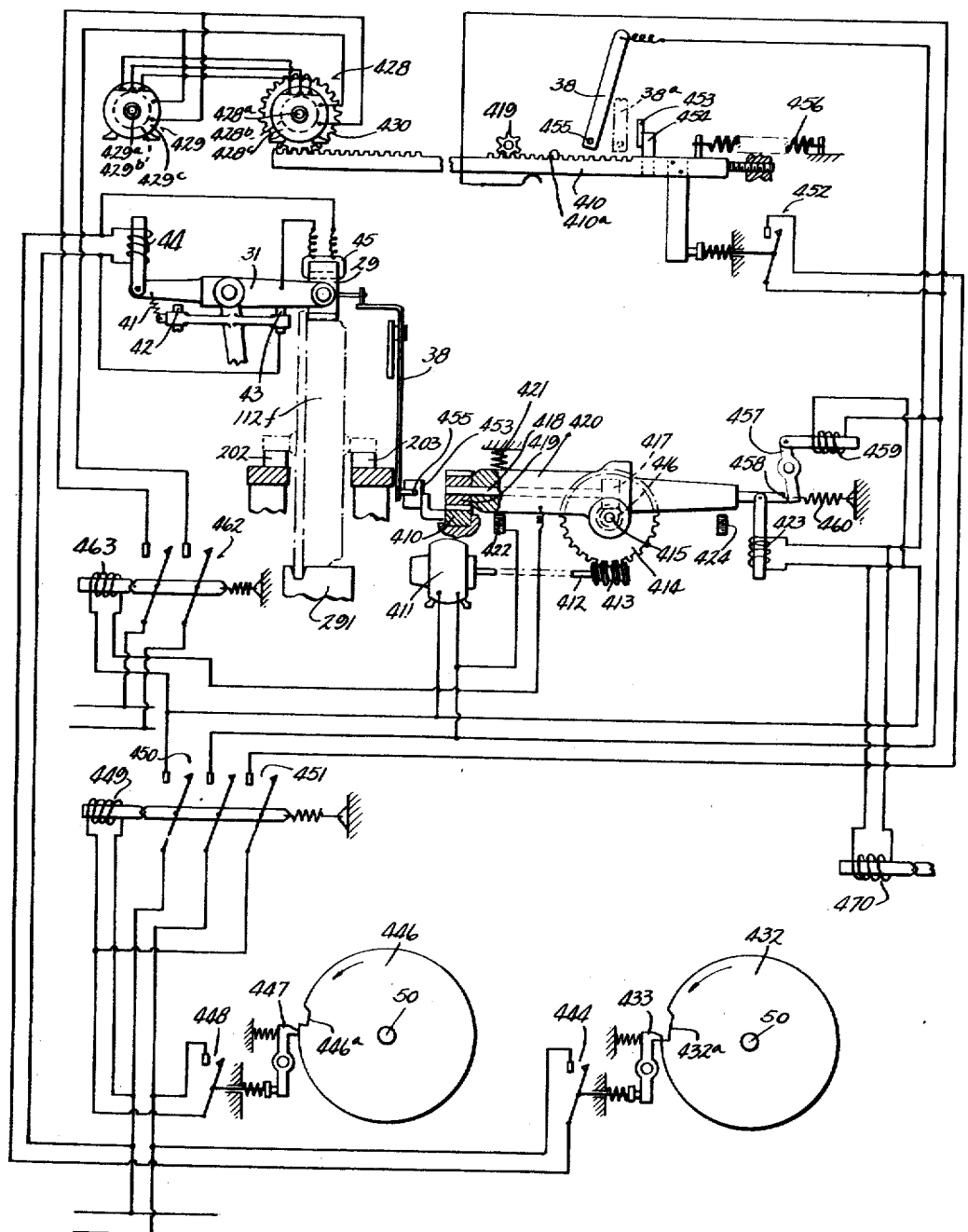

Figure 25 is a diagram of an unbalance measuring unit, used with the machine of Figs. 7, 8 for controlling operation of the driller unit of Figs. 21, 22, etc., and showing the operating relationship of the parts.

Figure 26 is a diagram showing the operating relationship of parts of means provided for the machine of Figs. 7, 8, for inspection of remaining unbalance after the unbalance has been corrected, and for accepting or rejecting the work pieces in accordance with the inspection result.

Figure 27 is a diagram showing the operating relationship of parts of an unloading device for the machine of Figs. 7, 8.

Figure 28 is a diagram illustrating still another method of pivoting a work piece for determination and correction of unbalance.

There will first be described some of the unbalance measuring principles used in the machines and units herein shown.

Figure 1:
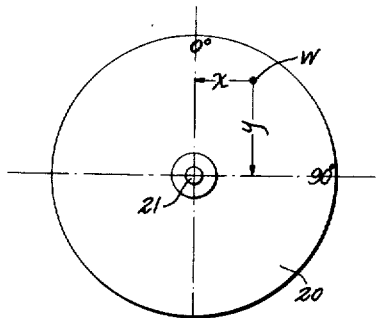
Figure 1 is a top view of a fly wheel shown in Fig. 2.
Figure 2:
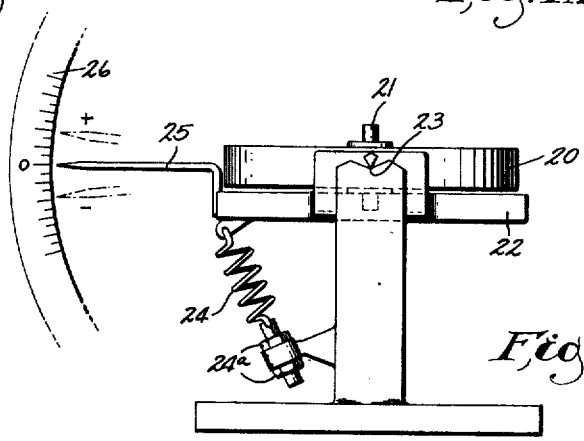
Figure 2 is a diagram illustrating a device for measuring unbalance in a work piece with the intended axis of rotation vertical.

In the diagrams, Figs. 1, 2, a work piece 20 is carried on a support 22 with the intended axis of rotation 21 vertical, the support being perfectly balanced about spaced pivots such as 23. The intended rotation axis, when vertical in Fig. 2, passes through the pivot axis 23 and if the work piece is perfectly balanced the work axis is retained in vertical position, Fig. 2, by a spring 24, there being adjusting nuts 24a to adjust the spring then to have zero load. A pointer 25 reads against a scale 26 to indicate the turning moment set up by an unbalance in either direction from the zero position.

If an unbalance exists in the work piece it may be considered for correction purposes as an undetermined weight $w$ acting at a point which, for the present, may be assumed to be, as shown in Fig. 1, within the 0°–90° quadrant of the work piece, at undetermined distances $x$ and $y$ respectively from the 0° and 90° radii of the axis 21. Unbalance so located will cause a moment of rotation about pivot 23 which is equal to $wx$ and is weighed by the spring 24 to indicate its value on scale 26, the pointer movements being proportional to such value.

Figure 1A:
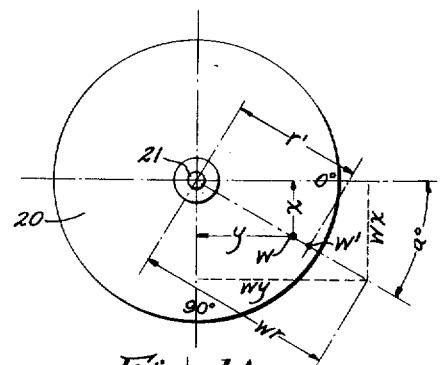
Figure 1A is a similar view of the fly wheel, rotated 90°.

If the work piece 20 is then turned clockwise ninety degrees, or such convenient angle and direction as will accomplish the purpose, on its support 22, to the position shown in Fig. 1A, the unbalance $w$ will now set up a turning moment about pivot 23 having a value $wy$, which will be similarly indicated on scale 26, and a parallelogram of the forces $wy$, $wx$, establishes $a°$ as the angular position of the unbalance relative to the 0° point on the work piece. From known values of $wx$ and $wy$, determined by the deflection of pointer 25 as previously described, the value of $wr$ in the force parallelogram is also established, and if work piece material is removed at a point $w'$ at any radial distance $r'$ along the radial line now located for the unbalance $w$, such material removal will balance the work piece when the weight of the removed material satisfies the equation $w'r'=wr$. The selection of any convenient radius value for $r'$ establishes the weight of material $w'$ required to be removed for effecting balancing; or the material can be added if preferred along the extended radial line of the unbalance at the other side of the axis 21.

The initial position of the unbalance $w$ in the moment measuring device of Fig. 2 may stand at any angle relative to the zero degree point on the work piece, but whatever the angle it may be determined in the manner described. Thus, for example, in Figs. 3, 3A there is shown the result when the work piece is positioned with an unbalance which, during the first measurement, is in the 180°–270° quadrant, whereby the correction angle is, Fig. 3A, 180°+$a°$ from the zero point on the work piece.

Figure 3:
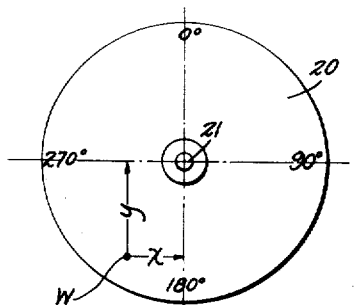
Figures 3, 3A are views respectively corresponding to Figs. 1, 1A, but showing an unbalance located in a different angular relationship.
Figure 3A:
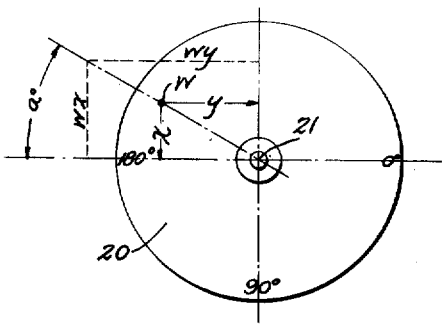

It will be noted that during the measuring of the moments $wx$ and $wy$, Figs. 1, 1A, the pointer 25 moves upwardly, Fig. 2, from the zero mark on scale 26, while during the measurement of $wx$ and $wy$, Figs. 3, 3A, the pointer moves downwardly. The relative direction of the first and second pointer movements obtained in measurements such as described is determinative of the angle of the unbalance relative to the zero degree point on the work piece. Thus, where the upward movement of the pointer 25 is considered as positive (+) and the downward movement as negative (—), it will be apparent that, if both the measurements are positive the unbalance is $a°$ from the zero degree point on the work piece, as in Figs. 1, 1A. If the first measurement is positive and the second is negative the angle is 90°+$a°$ from work piece zero. If both measurements are negative the angle is 180°+$a°$ from work piece zero, as in Figs. 3, 3A. If the first measurement is negative and the second is positive the angle is 270°+$a°$ from work piece zero.

From the foregoing it will be apparent that, where measurement of unbalance is effected in two 90° positions of a work piece in the manner described, the amount and direction of the movements of a measuring pointer such as pointer 25, Fig. 2, together completely determine the unbalance, both as to position and amount, so far as is necessary for correction thereof.

Referring to Figs. 4, 4A, 4B, 4C the work piece 20 is supported on a frame 27 with the intended work axis horizontal, the work bearing portions resting on level pivot blocks such as 28. A member 29 provides spaced shoe or work contact portions 29a and is loosely engaged, as by screws 30, on spaced arms 31a of a lever 31, the lever being pivoted on the frame at 32. A measuring spring 33 is rigidly fixed with frame 27 at 34 and at its outer free end carries a ball pivot portion 35 closely slidably fitted in a vertical slot of member 29, and also carries an extension rod 36. Frame 27 has fixed thereon a support 37 carrying an indicator pointer 38 pivoted at 39 and having a rearward extension 38a carrying spaced pins 40 which closely slidably engage the extension rod 36.

The lever 31 is urged by a spring 41 against a stop screw 42 and in such position the member 29 will be clear of the work piece 20. The lever may be urged in the other direction, against a stop screw 43 by the means of a solenoid 44, and in such position the member 29 contacts the work, as shown, and is free from the supporting screws 30. When in its upper position the member is urged by measuring spring 33 to a central position in which the spring is unflexed and pointer 38 stands at zero reading, and during its downward movement the member 29 contacts the work in such central position, the work meanwhile being prevented from rotating about its pivots, as later explained. Subsequently, when the work is freed, any unbalance in the work piece will set up a moment of rotation in one direction or the other about its pivot points on blocks 28 accordingly as the unbalance falls to the one or the other side of the vertical plane, Fig. 4A, of the pivots. The member 29 will tend to rotate with the work piece, whereby to deflect spring 33 and pointer 38 in proportion to the value of the force, that is to say, the deflection will be proportional to the product of the unbalance weight and its distance from the vertical plane of the work pivot, as previously explained.

It should be understood that angular movement of a member such as 29 with the work piece, at least theoretically, sets up some unbalance due to the member. The angular movement is ordinarily so slight that this effect is negligible but, if desired, the effect may be readily eliminated by suitable counterbalance means, not shown.

It is necessary that member 29 shall not shift relative to the work piece during the measuring operation. Various means, in addition to the contact friction set up by the weight of the member, may be used to prevent relative shifting during measuring; as, for example, suction, or increase of contact pressure, or magnetism, etc. In the present instance the member 29 is an electro-magnet, which may be energized by a coil 45.

The solenoid 44 and magnetizing coil 45, Fig. 4, may be automatically energized and de-energized at suitably timed intervals in a cycle of work operation, as follows:

A cam shaft 50, Fig. 4, may be timed for one rotation during a machine cycle and carries fixed thereon suitable rotary cams such as 51, 52. Cam 51 is configurated as at 51a to suddenly release a pivoted lever 53 urged to released position by a spring 54, the release of the lever operating a pressure switch 55 to effect a contact at 55a for energizing the solenoid 44. Later in the revolution of cam 51 the lever 53 is forced back to its position opening the switch 55 and the solenoid 44 is de-energized. The rotary cam 52 similarly operates a pivoted lever 56 for closing and later opening a pressure switch 57 in the circuit of coil 45, whereby to energize and de-energize the coil 45.

The switch operating configurations of the cams 51, 52 are of such relative angular position and extent that the coil 45 is energized after the member 29 has been seated on the work piece 20, as previously described, and remains energized during the operation of measuring the unbalance moment of the work, and is de-energized before the member 29 is raised from the work, that is to say, before solenoid 44 is de-energized. The magnet action therefore has no effect upon the initial positioning of member 29 on the work piece, or during its release.

It will be apparent that in the device of Fig. 4, as in the device of Fig. 2, the amount and direction of indicator pointer movement obtained in two unbalance weighing operations, made respectively with the work piece 20 in an initial position and in a second position ninety degrees rotated from the initial position, will determine the amount and angular position of any unbalance present in the work piece sufficiently for correction of the unbalance.

Figure 5A:
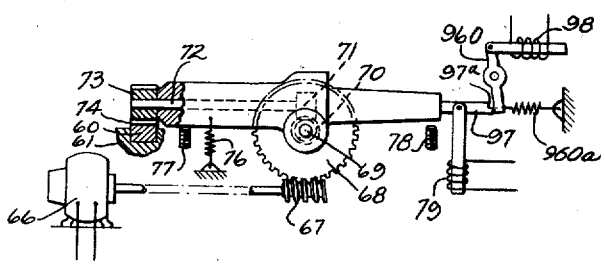
Figure 5A shows some of the parts of Fig. 5 in their relation to other parts of the same unit.

In Figs. 5, 5A there is shown mechanism whereby the movement of indicator devices such as pointer 25, Fig. 2, or pointer 38, Fig. 4, may be utilized for control of certain operations for correction of the unbalance.

The pointer 38, Fig. 5, is arranged adjacent to a reciprocable slide or bar 60, Figs. 5, 5A, which is guided on a support 61. Also adjacent to the slide 60 there is an indexible carrier or support 62 upon which are equi-angularly spaced three pattern discs 63, 64, 65 each of which are rotatable on an axis parallel to the index axis of carrier 62 and also axially movable. Three index movements of carrier 62, each of 120°, complete a cycle of carrier movement, and progressively moves one of the discs 63, 64, 65 through each of three disc positions A, B, C.

The slide 60 is moved in forward direction, to the left in Fig. 5, by the means of a motor 66 which is connectible to the slide by the means of a worm gear 67, a worm wheel 68 fixed on a shaft 69, a pair of meshed helical gears 70, 71, a shaft 72, a pinion 73, and a rack 74 fixed with the slide. The pinion 73 is carried by a frame or housing 75 which is pivoted about the axis of shaft 69 and urged by a spring 76 against a stop 77, in which housing position the pinion is in driving engagement with rack 74. At the conclusion of the forward movement of slide 60, determined as later explained, the housing 75 is swung in the other direction against a stop 78 by the means of a solenoid 79, such movement disengaging the pinion 73, and the slide is then rapidly moved in reverse direction, to the right in Fig. 5, against a stop 80, by suitable means, such, for example, as a spring 81. During the forward movement of slide 60 a face portion 82a of a bar 82, which is connected for movement with the slide, sweeps forward to the left in Fig. 5, across whichever one of the discs 63, 64, 65 occupies the indexed position indicated as A. Also during the forward movement an electric contact member 83 carried on a bar 84, which is connected for movement with the slide 60, moves forward, to the left in Fig. 5, to effect closed contact with a contact member 83a carried on the measuring pointer 38.

The mechanism of Figs. 5, 5A controls the reciprocation of slide 60 as follows: A cam 90 is fixed on the shaft 50, which is timed to have one revolution per machine cycle as previously stated. Cam 90 is configurated as at 90a to release a pivoted lever 91, at a predetermined time in the machine cycle. Lever 91 is urged toward released position by a spring 91a and when released closes a pressure switch 92 normally held open by a relatively light spring 92a, thereby energizing a solenoid 93 to close a motor switch 94, normally held open by a spring 94a. The slide 60 is then in its right-hand position against the stop 80 and the pinion 73 is engaged with rack 74, as shown in Fig. 5, and upon the energizing of motor 66 through switch 94 the slide immediately starts movement to the left.

The closing of motor switch 94, Fig. 5, simultaneously closes a switch 95, and directly after the slide 60 starts to the left a pressure switch 96 is closed by a spring 96a, following which the solenoid 93 is energized through the switches 95, 96 independently of the switch 92. The lever 91 may then be returned to the position opening switch 92, by the means of the configuration on cam 90, the motor 66 continuing energized to move the slide 60 to the left.

During such left-hand movement the contact member 83 in the circuit of the solenoid 79, closes the solenoid circuit through the contact member 83a carried by pointer 38, whereby the housing 75, Fig. 5A, is swung to the position abutting stop 78 and disengaging pinion 73 from rack 74 and slide 60. When pinion 73 is thus disengaged the spring 81 starts movement of slide 60 to the right in Fig. 5, but this movement interrupts the circuit of solenoid 79 and in order for the slide 60 to complete its cycle to initial starting position it is necessary to provide other means to maintain the housing 75 in the position disengaging the pinion. Such means are provided as follows:

A pivoted lever or latch 960, Figs. 5, 5A, is urged by a spring 960a in a direction to disengage the latch from a rod 97 fixed on the pivoted housing 75. But when the switch 95 is closed at the time of the starting of motor 66, as previously described, a solenoid 98 is energized which urges the latch in the direction to engage a notch 97a of the rod 97. At the moment, since housing 75 is in the position abutting stop 77, such engagement is prevented by abutment of the latch against the end of the rod, but when the housing is swung to its other position, abutting stop 78, the latch will engage the notch. The switch 95 remains closed, whereby to continue to energize solenoid 98 until the motor switch 94 is opened, which occurs at the completion of the right-hand movement of slide 60, when the bar 84, just prior to the abutment of slide 60 against stop 80 opens the pressure switch 96, thereby interrupting the circuit through solenoid 93. When solenoid 98 is de-energized as described the spring 960a immediately withdraws latch 960 from notch 97a and spring 76 then returns the housing 75 to its initial position against stop 77 and with pinion 73 engaging rack 74, but since the motor 66 is now de-energized no movement of slide 60 will take place until the cycle of slide movement is again started, as before.

From the preceding description of the operation of the cycle of movement of slide 60 it will be noted that the re-engagement of the pinion 73, just mentioned, completes the positioning of all the parts in their initial position for starting another cycle at a time determined by rotation of the cam 90. The operation of the machine herein shown requires two of the described reciprocatory movements or cycles of slide 60, respectively during the time when the pointer 38 occupies its different positions for the first and second measurement of unbalance in a specific work piece. The first cycle has just been described. The second cycle is the same except that the reversal of slide movement from left to right, Fig. 5, will probably take place at a different point in the left-hand movement, as determined by the position of pointer 38 during the second unbalance measuring operation. The second cycle is initiated in proper timed relation similarly to the first cycle, as by a second configuration 99 of the cam 90.

Figure 6:
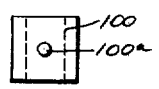
Figures 6, 6A show a pattern member used in the device of Fig. 5, respectively in plan and elevation, and enlarged.
Figure 6A:

Each of the discs 63, 64, 65, Fig. 5, carries a block member such as 100, these blocks being alike and square in lateral dimensions and relatively thin; an individual block being shown in Figs. 6, 6A. The blocks provide an upstanding round rod portion 100a axially vertical and centrally positioned relative to the square sides, and are cut away on their bottom face as at 100b, partly to avoid rocking and also to act as magnets, the blocks being permanently magnetized. The blocks may be shifted about to any position on their discs but, being magnetized as mentioned, will be normally yieldingly retained wherever positioned.

As later explained, when a disc occupies the position C, Fig. 5, and is about to be indexed to position A, the block 100 has been returned to what may be termed its initial position relative to its disc, indicated at 100—a, Fig. 5. The subsequent indexing of support 62 through 120° to effect the disc position A carries the block along with the disc in the same relative position, but the block now has one of its side faces substantially parallel with the face 82a of the bar 82, as shown at 100—1, Fig. 5. Shortly following such indexing, the first measuring operation having meanwhile been completed whereby to position pointer 38 in, for example, the full line position shown in Fig. 5, the cam 90 initiates the first cycle of reciprocatory movement of slide 60, previously described, and the relative proportion and movement of the parts is such that the forward sweep of arm face 82a positions the block 100, as at the dotted line position 100—2, Fig. 5, for its center to be spaced a distance from the disc radius line, marked 0° on the diagram, exactly proportional to the $wx$ value on the diagram Figs. 1A, 3A, that is to say, exactly proportional to the deflection of pointer 38 from its zero position, and will be at the one side or the other of the zero degree radial line accordingly as the pointer reading is in the positive direction P, or in the negative direction N.

Following positioning of the block 100 in the position 100—2, Fig. 5, as described, the disc which is in position A is rotated 90° on its vertical axis, in the direction indicated by the arrow associated with disc 63, the disc rotation, in the present instance, positioning the block at 100—3. Shortly following such positioning, the second measuring operation with the work piece which is being measured also turned 90° for reasons previously explained having meanwhile been performed, the cam portion 99 of the cam 90 initiates the second cycle of forward movement of the slide 60. Since the first cycle of forward movement of arm face 82a positioned one side of the block exactly parallel with the face, the 90° indexing of the disc leaves the block with the side adjacent the arm face exactly parallel thereto, and the second cycle will not disturb the first setting of the block relative to the 0° radial line. In this second cycle of forward movement the pointer 38 may stand in any position of its range of movement, as determined by the unbalance in the work piece, as, for example, in a negative reading position indicated by the dotted lines, Fig. 5, but, whatever the pointer position, the forward movement of the arm face 82a will position the block 100, as for example at the position 100—3, Fig. 5, with its center at a distance from the 90° radius of the disc which is exactly proportioned to the wy value of the diagrams, Figs. 1A, 3A, measured in the second measuring operation.

It will be apparent that in the position 100—4 of the block 100, established as described, the position of the center or axis of the round portion 100a of the block relative to the axis and 0° radial line of the disc which is in the position A establishes what may be termed a mechanical pattern of a force diagram such as the diagram Figs. 1A, 3A, in which the center of the block stands on a radial line corresponding to the angular position of any unbalance in the work piece used to establish the position of the block, and such pattern may be utilized to effect correction of the unbalance, as later explained. Also, the radial distance of the center of the block from the disc axis represents the value $wr$ of the force diagram whereby the radial position of the block may be used, if desired, to control the amount of material removed, or added, to correct the unbalance.

The measuring and recording methods described may be incorporated in a variety of ways in machines for the balancing of work pieces. In Fig. 7 there is shown a machine for automatically balancing fly wheels, utilizing a cycle of operations which measures the unbalance of the individual fly wheel while the intended axis of fly wheel rotation is horizontal, as in the method explained for the device of Fig. 4. The machine also utilizes, as a part of its cycle of operations, the method of transferring the unbalance measurements to a mechanical pattern, as explained in connection with the diagram, Fig. 5, together with various other coordinated cycles and methods, as will be explained.

Referring particularly to Figs. 8, 7, 9, the balancing machine is intended to operate on fly wheels which have been delivered, as by a suitable conveyor, to an initial position adjacent the machine, indicated at 112a, Fig. 8, the fly wheels being picked up by the machine to proceed through a step-by-step sequence of positions and of operations including unbalance measuring, correcting and inspection, and at the completion of the several operations the fly wheel, provided it is found upon inspection to be balanced with predetermined limits, is delivered to a position indicated at 112j, from which it may be removed by any suitable conveyor.

The machine operates simultaneously upon several fly wheels respectively in different positions, as will be explained, and the time required to complete a fly wheel is therefore only a fraction of the time required for the fly wheel to pass through the machine, being no greater than the time required for one operation of the sequence.

The machine includes a stationary frame 113, Fig. 8, with which are fixed horizontally spaced parallel rails or supports 114, 114a between which the fly wheels are moved during their progress through the machine. A primary drive shaft 115 is driven continuously from any suitable power source, not shown, and continuously reciprocates a slide-rod 116, the rod being guided in the frame for right and left-hand movements, Fig. 7, and reciprocated through a worm 117, a worm wheel 118, a crank 119 fixed with the worm wheel and a connecting rod 120 pivoted at the one end on the crank and at the other end on a cross-arm member 121 which is rigidly fixed with the slide-rod. At its one end the cross-arm has rigidly fixed therewith an arm or bracket 122 carrying a selector-timer unit generally denoted by the numeral 123, Figs. 7, 11. The unit 123 is therefore continuously reciprocable from the drive shaft 115.

The reciprocatory unit 123 is provided with a plurality of sets of actuator dogs and control cams therefor, the sets being respectively generally denoted as 124, 125, 126, 127, 128, Fig. 11. The set 127, shown in Fig. 12, is illustrative of each of the sets. For each set there is provided a pair of cams such as 129, 130 respectively fixed on cam shafts 131, 132 which are rotatably mounted in the frame of the unit 123 and geared together for opposite directions of rotation by the meshed gears 133, 134, Fig. 11, the cam shaft 131 having fixed therewith a ratchet wheel 135. As best shown in Fig. 7, a ratchet dog 136, which is pivoted on frame 113, is adapted to engage ratchet wheel 135 at each reciprocatory movement of unit 123 to the right in Fig. 7 and operates to turn the ratchet wheel, together with the cams such as 129, 130, through an angular movement corresponding to the angular spacing of the teeth on the wheel. Each cam pair of the different sets is provided with suitable configurations such as 129a, 130a, Fig. 12, cooperating to effect pivotal movement of a pair of cam dogs such as 138, 139 whereby to position either dog with its inner end raised upwardly by suitable means, such as springs, not shown, to effect a pushing engagement with an abutment block, such as 140, carried by a slide such as 141 which is reciprocably guided on the machine frame. When the cams of a pair of dogs are in a position where neither dog is raised as described, the corresponding slide remains stationary in the position where last shifted, until the reciprocatory movements of the unit 123 have turned the cams to raise one of the dogs to abutting position.

It will be apparent that, by the means of the different sets of actuator dogs and cams of the unit 123 slides, such as the slide 141, respectively associated with the different sets, may be moved in either direction during a reciprocatory movement of the unit 123, or may remain stationary at either end of the reciprocatory slide movement while the unit 123 effects one or more cycles of reciprocation, accordingly as the cams are configurated.

The dog-cam set 124, Fig. 11, of the unit 123 operates a reciprocably guided slide 142, Figs. 9, 13 in the manner previously described, the abutment block for this slide being offset from the slide as shown in Fig. 10. The dog-cam sets 125, 126, 127, 128 respectively similarly operate slides 143, 145, 146, 147, the slide 143 being relatively short, as best shown in Fig. 13, and guided on a bar 144 which is fixed with the machine frame.

The slide 142, Figs. 10, 13, is connected for timed movements both of a loading carrier 148, Figs. 7, 18, and of an unloading carrier 149, Figs. 7, 27. The loading carrier 148 moves between the positions respectively shown in full and dotted lines, Fig. 18, whereby to first receive the work piece as it is shifted from the position 112a to the position 112b, and next to move the work piece to the position 112c. The unloading carrier 149 has similar movement. It receives the work piece in the position 112h, Figs. 7, 27, and delivers the piece to position 112i. The slide 142 is connected to effect the movements mentioned through a connector arm 150, Fig. 13, rigidly fixed with the slide and with a correspondingly reciprocable bar 151 having angular rack teeth 151a meshed with a gear segment 152, Figs. 9, 13, fixed on a shaft 153, the shaft having a lever 154 fixed thereon and connecting with the loading carrier 148 through a pivoted rod 155 and a lever 156, Fig. 8, fixed on a shaft 157 upon which is also fixed the loading carrier 148; the shaft 153 also having another lever 158 fixed thereon and connecting with the unloading carrier 149 through a pivoted connector rod 159 and a lever 160, Fig. 8, fixed on a shaft 161 upon which is also fixed the unloading carrier 149.

The operations on the machine of Figs. 7, 8, require that the fly wheel be rotated on its own axis in each of the positions 112d, 112e, 112g. For such rotation there are provided similar rotator units each including a pair of spaced wheels for supporting and rotating the work piece. For the position 112d there is a pair of such wheels 162, 163, Fig. 8. For the position 112e there is a pair of wheels 164, 165. For the position 112g there is a pair of wheels 166, 167. In Fig. 8 the wheels are shown in the positions they occupy during the supporting and rotation of the fly wheels. The supporting wheels must be withdrawn axially, downwardly in Fig. 8, from such positions in order to transfer the fly wheels from one station to another, as later described. The supporting wheels are, therefore, mounted for such axial and rotary movement in a manner which is similar for each pair of supporting wheels except as later pointed out. The mounting and arrangement of drive gears for the supporting wheel pair 162, 163 includes parallel shafts such as 168, 169, Fig. 8, on which the wheels are fixed, the shafts each being journaled at axially spaced points in bearing members such as 170, 171 for the wheel pair 162, 163, and in bearing members 172, 173 for the wheel pair 164, 165, and in bearing members 174, 175 for the wheel pair 166, 167. The bearing members 174, 175 are supported for vertical movement, Fig. 9, on a vertical slide bar 176, Figs. 8, 9, and the bearing members 170, 171 are supported for similar vertical movement on a vertical slide bar 177, Fig. 8, these slide bars being simultaneously shifted vertically at intervals, as later explained. The wheel pair 164, 165 requires no vertical movement and the bearing members 172, 173 for this wheel pair are suitably rigidly fixed on the machine frame. The bearings of the roll shafts in the bearing members act as guides for the axial shaft and roll movement and for each roll pair there are gears such as 178, 179, Fig. 8, fixed on the respective shafts, each gear engaging with an axially stationary drive pinion such as 180, Fig. 7, also journaled in the bearing members. The corresponding drive pinions for the other roll pair units are indicated at 181, 182, Fig. 7.

The supporting roll pairs 162, 163, etc., are all simultaneously shifted to the left, Fig. 9, to their fly wheel supporting and rotating positions there shown and shown in Fig. 8; or alternatively oppositely simultaneously shifted to a position permitting transfer of the fly wheels from one station to another, by the reciprocatory movements previously explained of the slide 145, Fig. 13. At its right-hand end, Fig. 13, the slide 145 is provided with angular rack teeth 183 which continuously engage with correspondingly angular teeth on a gear segment 184 which is fixed on a shaft 185 that is journaled in the machine frame and extended axially for the support of two similar levers 186, 187, Figs. 7, 8, 9, the end of each lever being slotted to engage shifter pins such as 188, 189, the pins being fixed at the opposite ends of a laterally and vertically movable support bar 190, Fig. 7. The support bar 190 is fixed rigidly with spaced arms 191, 192 which are coaxially pivoted on the machine frame; the pivot of the arm 191 being shown at 191a, Fig. 9, and of the arm 192 at 192a, Fig. 7. At suitable spacing along the bar 190 there are provided upstanding arms or members, rigidly fixed with the bar, for the axial shifting of each of the roll pairs 162, 163; 164, 165 and 166, 167. The shifter arm members for the roll pair 162, 163 are illustrative. Referring to Figs. 7, 8, shifter arm members such as 195, 196 are provided with spaced outstanding fork portions such as the fork portions 195a, 196a, the respective fork portions engaging opposite end faces of the gears 178, 179 to effect the shifting.

By the described mechanism, as the reciprocatory slide 145 is moved to the left in Fig. 13 the supporting roll pairs 162, 163; 164, 165; and 166, 167, Fig. 8, are simultaneously withdrawn from their fly wheel supporting positions, downwardly in Fig. 8 from the position there shown; and as the slide 145 is moved to the right in Fig. 13 the roll pairs are returned to their Fig. 8 positions, each of these movements taking place at timed intervals determined by the selector-timer unit 123, in the manner previously explained.

For each of the fly wheel positions 112d, 112f, 112g, the balancing operation requires supporting a fly wheel on pivot blocks with its axis horizontal, and for these positions there are provided pivot block pairs such as 200, 201; 202, 203; and 204, 205, Figs. 7, 8, the different blocks of a pair being respectively fixed on the rails 114, 114a. For the fly wheel position 112d and 112g the operations require that the fly wheels be lifted off the pivot blocks and rotated 90° as later explained. It is to effect such lifting for these positions that the fly wheel supporting roll pairs 162, 163 and 166, 167, Fig. 8, are vertically movable with the slide bars 176, 177, as previously mentioned.

The reciprocatory movement of the slide 142, Fig. 13, in addition to effecting the movement of the loading carrier 148 and unloading carrier 149 as previously explained, also effects the vertical movement of the supporting roll pairs 162, 163 and 166, 167 just referred to. The slide bars 176, 177, Fig. 8, in their downward extension, each operate in spaced guide members fixed on the frame, such as members 206, 207 and 208, 209, Figs. 7, 13, and the bars respectively carry shifter pins 210, 211, Fig. 13, each engaging angular cam slots in the slide 142, the cam slot for the vertical slide bar 176 being best shown at 212 in Fig. 14, the slot for the other bar 177 being similar. It will be seen that as the reciprocable slide 142 is moved to the left from the position shown in Fig. 14 the slide bars 176, 177 and the roll pairs 166, 167 and 162, 163 respectively carried thereby will be moved upwardly, and during the right-hand movement of slide 142 these roll pairs will be moved downwardly, such upward and downward movements being suitably timed by the selector-timer unit 123.

The rotation of the supporting roll pairs 162, 163 and 166, 167, Fig. 8, for effecting 90° turning of the fly wheel when in positions 112d and 112g, takes place after the roll pairs have been shifted upwardly, as just described, whereby the fly wheel is lifted from its pivot blocks during such rotation. Such 90° fly wheel rotation is effected by the reciprocatory movement of slide 143. Referring to Fig. 7, the slide 143 carries an arm 215 fixed thereon, which is connected for reciprocatory movement of a rack bar 216, Figs. 7, 8, through an arm 217 fixed with the rack bar, and through a connecting link 218 pivoted at its opposite ends with the arms 215, 217. The rack bar 216 carries rack portions such as the rack 219 engaging the pinion 182 which is connected for rotation of the roll pair 166, 167, as previously described, there being another similar rack portion, hidden by the other mechanism, which engages the pinion 180 which is connected for the rotation of the roll pair 162, 163. The rack bar 216 is slidably guided and carried for vertical movement with the slide bars 176, 177 whereby to maintain engagement of the rack portions with the pinions 180, 182 in any vertical position of the corresponding roll units. During righthand movement, Fig. 7, of the rack bar 216, which takes place while the fly wheels in the positions 112d, 112g, are lifted from their pivots by the upward movement of the supporting rolls the movement of the rack bar turns the supporting roll pairs to rotate these fly wheels 90° in the direction of the arrows, Fig. 7. The lefthand movement of the rack bar turns the supporting wheel pairs in the opposite direction but such left movement takes place during the time while the supporting wheels are in the lower position and therefore does not rotate the fly wheels, which are then supported on their pivot blocks.

In the position 112e the fly wheels are also rotated while supported by the roll pairs 164, 165, but in this position, as will later be more fully explained, rotation is from a shaft 225, Figs. 8–10, the shaft being journaled in the machine frame and connected to the driving pinion 181 of the roll pair 164, 165 through a worm 226, Fig. 10, and a worm wheel 227 which is fixed with a shaft 228, Fig. 7, that actuates the pinion 181.

Referring to Fig. 8 it will be seen that the machine incorporates an indexible carrier or support 62 and three equiangularly spaced discs 62, 63, 64 which correspond to the carrier and pattern discs of the diagram, Fig. 5, and are therefore indicated by the same numerals in the machine. The pattern discs of the machine are indexible with the carrier successively through positions A, B, C for the same purpose as explained for the diagram, Fig. 5, and for other purposes, which will appear.

The carrier 62, Figs. 8, 10, 15, is supported from the machine frame for successive 120° index rotation in the direction of the arrow, Fig. 8, and for vertical movement, Fig. 15. A part 229 is fixed with a frame member 230 and journals one end of an index sleeve 231 providing a bore which rotatably carries a shaft 232. The shaft 232, an index disc 233, a hub or sleeve 234 and the carrier 62 are rigidly fixed together for unitary rotary index and vertical movements. The vertical movement is effected from the reciprocatory movement of the slide 145, Fig. 13, the shaft 185, which is actuated from the slide 65 for other purposes by mechanism previously described, also being connected to effect such vertical movement through a lever 235, Figs. 7, 13, a connecting rod or bar 236 pivoted to the lever 235 and also to a lever 237 fixed on a shaft 238, Figs. 7, 15, and another lever 239, fixed on the shaft 238, which operates on the lower end, Fig. 15, of shaft 232 to lift the carrier unit in the one direction of lever movement, the unit being urged downward by gravity, or by suitable springs not shown, in the other direction of lever movement.

The 120° indexing movements of the carrier 62, Figs. 8, 15, are effected by the reciprocatory movement of the slide 147, Fig. 13, the slide having fixed therewith a rack 240, Figs. 13, 15, engaging a gear segment 241 which is fixed on the index sleeve 231. The index sleeve also has fixed therewith an actuator arm 242, Figs. 15, 16, carrying an actuator portion 243. During the upward movement, previously described, of the shaft 232 and the unit carried thereby, the actuator 243 is engaged by one or another of spaced index slots 244, 245, 246 in the index plate 233. The index movement of the slide 147 takes place during such engagement, thereby rotating the carrier 120° in the direction of the arrow, Fig. 8, and subsequently, when the shaft 232 moves downwardly, the index plate engages one or the other of spaced locating notches 247, 248, 249 with an angular point 250 on a post 251 which is fixed on the machine frame, being carried in this instance on an arm 252 fixed on the post 231. It will be seen that by the mechanism described the pattern discs 62, 63, 64 of the machine, Fig. 8, may be indexed successively through the A, B, C positions there shown, by the reciprocatory movement of the slide 141 and timed by the timer unit 123, Fig. 11.

The pattern disc 63, 64 or 65 whichever occupies the A position, Fig. 8, is indexed 90° while the carrier 62 is in its lower position previously referred to. Such indexing is effected by the reciprocatory movement of the slide 143, Fig. 13; the rack bar 216, Fig. 8, which is reciprocated by the slide for other purposes by mechanism previously described, also being connected for such index movement through a connecting rod or bar 260, Figs. 8, 17, pivoted at the one end with the rack bar and at the other end with an arm or plate member 261 which is pivotally carried on a supporting plate 262. The plate 262 is actuated for vertical movement from the reciprocatory slide 142, Fig. 13, being fixed on the roll shaft bearing member 171, Figs. 8, 17, which is actuated for vertical movement from slide 142 for other reasons by mechanism previously explained. Each of the pattern discs are exactly alike in structure, the upper portions which constitute the pattern discs indicated as 62, 63, 64, Fig. 8, each being unitarily fixed on a stem such as 263, Fig. 17, which locates the disc on the carrier 62, and with a friction disc such as 264. Upward movement of the supporting plate 262, such as just mentioned, brings the index plate 261 into contact with the friction disc 264 and the index movement of plate 261 then effects the 90° rotations of the position A disc in the direction of the arrow, Fig. 8, during the movement of rack bar 216 to the right, and in suitable timing for operations later described. During the other direction of movement of rack bar 216 the plate 262, together with index plate 261, is in its lower position, previously described, in which the friction plate 264 does not contact the index plate and there is therefore no reverse movement of the A position disc.

The pattern disc 63, 64, or 65, Fig. 8, whichever occupies the position B, Figs. 8, 17, is rotated from the shaft 225 in exact timing with the rotation of the position 112e fly wheel, which is rotated from the same shaft by mechanism previously described. The B position disc is driven from the shaft 225 through the worm and wheel 226, 227, Fig. 10, and through a meshed pinion and gear 270, 271, meshed bevel gears 212, 213, and a sleeve 274, the sleeve having the gear 273 fixed on its lower end and a friction disc 275, Fig. 17, fixed on its upper end, the friction disc 275 being rotatably supported at fixed height in the machine. Following the 120° index movement of carrier disc 62 the carrier disc moves downwardly by mechanism previously described, to the position shown in Fig. 17, where the discs 264, 275 are frictionally engaged, and when shaft 225 is rotated, as later explained, the B position pattern disc is rotated, as well as the 112e position fly wheel.

The pattern disc 63, 64 or 65, Fig. 8, whichever occupies the position C, Figs. 8, 15, is continuously rotated whenever the carrier 62 is in its lower position, that is to say, at all times except when the carrier is raised for its 120° index movement. The C position pattern disc is driven through a helical gear 276, Fig. 8, fixed on drive shaft 115, a gear 277, a shaft 278, Figs. 7, 15, a worm 279, a worm wheel 280 and a sleeve 281 carrying a friction disc 282 rotatably supported at fixed height in the machine. The downward movement of carrier disc 62, following the 120° indexing of the carrier disc, frictionally engages the discs 282, 264 whereby the C position pattern disc is rotated, as stated.

For movement of the fly wheels in a step-by-step progression from the position 112c, Fig. 7, to the position 112h, there is provided a transfer carrier having suitably timed vertical and horizontal movements. The carrier includes a longitudinally extended bar 290, Figs. 10, 14, upon which are fixed spaced fly wheel support blocks such as 291 having equal spacing corresponding to the spaced fly wheel positions. The carrier bar and blocks are vertically guided by frame members such as 292, 293, Fig. 14A, and movable between the full line and dotted line position, Fig. 14, from the reciprocatory movement of the slide 146, Figs. 13, 14A, the slide having rack teeth engaging spaced gears 294, 295 fixed on crank shafts 296, 297 having crank pins 298, 299 each engaging a slot 300 in the bar 290. Movement of slide 146 to the right, Fig. 13, moves transfer bar 290 and blocks 291 upwardly from the full line position, Fig. 14, to the dotted line position there shown, and subsequent left-hand movement of the slide returns the bar and support to the full line position. The transfer bar 290 and blocks 291 are horizontally moved by the reciprocatory movement of the slide 147, the right end of the slide, Fig. 13, carrying a driving rod 301 engaging a suitable socket in the end of a bar 302, Figs. 13, 14, which is fixed on a rod 303 slidably guided in the machine frame and having fixed thereon a bar 304 which is slidably engaged by a driver rod 305 fixed on the bar 290. A characteristic cycle of vertical and horizontal movements of transfer bar 290 and blocks 291 will later be more fully described.

The operations of unbalance measuring and correcting and the inspecting of the corrected work pieces are performed in the four work positions 112d to 112g, Fig. 7, the work positions 112a, b, c being incidental to the delivery of work pieces to position 112d, and the positions 112h, i, j to the removal of work pieces from position 112g, as will appear.

A loading device, Fig. 18, is used for the transfer of work pieces from an initial position 112a to the position 112b engaging the loading carrier 148 when the carrier is in its Fig. 18 position. A slide 310, Fig. 18, is suitably guided for reciprocatory movement adjacent to the 112e work piece position, where the work is carried on a support 311, the work pieces being located on the support one after another, either manually or by a suitable conveyor. A portion 312 of such a conveyor is shown. The slide 310 is actuated through a cycle of forward movement, to the left in Fig. 18, and reverse movement, by a reversible motor 313, driving through a worm 314, a worm wheel 315, a shaft 316, a pinion 317 and a rack 318 which is fixed with the slide. During the forward, or left-hand, movement of the slide an actuator plunger 319 is in a lower position, indicated by dotted lines, in which an end portion 319a engages behind the work piece to force the work to the left, to position 112b. At the end of the forward movement the actuator 319 is withdrawn upwardly and the slide is returned to the position shown in Fig. 18.

The loading cycle just mentioned is controlled by the following mechanism. A timing cam 321, Fig. 18, is fixed on the shaft 50 and is configurated at 321a to release a pivoted lever 322 which is urged to released position by a spring 322a, the release of the lever operating a pressure switch 324 to effect contacts at 324a, 324b. Later in the rotation of cam 321 the cam forces lever 322 back to the position shown and the contacts 324a, 324b are again interrupted. The temporary contact at 324b energizes a solenoid 325 whereby to shift a motor reversing switch 326 to the left from the position shown to a position for effecting travel of the slide 310 to the left, the switch being temporarily retained in the left position by a detent mechanism 326a. The temporary contact at 324a energizes a solenoid 327 whereby to close a starting switch 328, against the resistance of a spring 328a. This occurs immediately following the positioning of the reversing switch 326, and the motor 313 then starts the left-hand movement of slide 310. The actuator plunger 319 is shiftable by a pivoted lever 329 to its upper position defined by a stop 330, where it is normally retained by a spring 331, or to its lower position defined by a stop 332, respectively by the means of solenoids 334, 333 energized by a switch 335 having contacts 335a, 335b. At the same time that reversing switch 326 is shifted to the left the actuator switch 335 is shifted to effect a contact at 335a whereby to energize solenoid 333 to shift actuator 319 to its lower position, which it continues to occupy during the left-hand slide movement. The closing of starting switch 328 also closes a switch 336, which is connected in series with a pressure switch 337 which is then open, but as soon as the left-hand movement of the slide 310 has proceeded sufficiently to relieve the pressure switch 337 this switch also closes and a holding circuit through solenoid 327 is then completed through the two switches 336, 337, whereby the motor will continue to run, although the initiating pressure switch 324 is opened, as mentioned, shortly thereafter. At the completion of the left-hand movement of slide 310 to the dotted line position, Fig. 8, the work piece has been shifted from the position 112a to the position 112b engaged by carrier 148 and at this time a pressure switch 339 is closed whereby to energize a solenoid 340 which shifts reverser switch 326 back to the position shown in Fig. 18, thereby reversing the direction of motor 313 to return the slide 310 to the right, to its full line position. The shifting of reverser switch 326 also interrupts the circuit to the solenoid 333 and energizes the solenoid 334 through the switch contact 335b, whereby the actuator 319 is shifted to its upper position and remains there during right-hand movement of slide 310. When slide 310 reaches its right-hand position the circuit through pressure switch 337 is interrupted thereby de-energizing the holding circuit of solenoid 327 of the starting switch 328, which is then returned to initial position by the spring 328a. The complete cycle of the initial loading device, as described, returns all the parts except timing cam 321 to the position shown in Fig. 18, for the starting of another cycle when determined by the rotation of the timing cam.

From the 112b work position, Figs. 8, 18, where the work piece is engaging the loading carrier 148 in its full line position, Fig. 18, the work piece is transferred to the 112c position by the movement of carrier 148 to its dotted line position. Such movement of the loading carrier is effected by the movement of slide 142, suitably timed by the timer unit 123, Fig. 11, as previously described.

From the 112c work position, Fig. 7, the work piece is transferred to the position 112d for the first of two unbalance measurements such as previously referred to in connection with the weighing devices of Figs. 2, 4 as will be explained. In the machine as here shown, during both the two measurements, the fly wheel bearing portions such as 341 rest on the pivot blocks 200, 201. To effect the transfer from position 112c to such position the transfer bar 290, Fig. 14, is shifted from its left-hand position, to the left of the position shown in Fig. 14, to the right-hand position there shown, while the bar is in the lower position there shown. While in such right-hand position the bar is shifted to its upper position, indicated by the dotted lines, whereby one of the transfer blocks 291 lifts the fly wheel off the loading carrier 148, which is then in the dotted line position, Fig. 18. Next the transfer bar, while still in upper position, is returned to its left-hand position, the fly wheel at the conclusion of this left-hand movement being supported by the transfer block 291 directly above the pivot blocks 200, 201. It will be noted that during the left-hand transfer bar movement the loading carrier 148 and unloading carrier 149 are both in their Fig. 7 position and to clear the fly wheel support portions thereof the two end transfer blocks are cut away as at 291a, Fig. 9. The transfer bar then moves to its lower left-hand position, thus completing a transfer cycle, and the fly wheel is then supported on the pivot blocks 200, 201 in position for the first unbalance measuring operation, as mentioned. During the left-hand movement of the transfer bar in this and the transfer cycles subsequently mentioned the supporting roll units 162, 163; 164, 165 and 166, Fig. 8, are in their withdrawn position, out of the path of the transfer blocks 191, that is to say, downwardly in Fig. 8, but since the right-hand transfer bar movement is timed by the unit 123, Fig. 11, to take place only when the carrier is in its lower position where the blocks will pass underneath the rolls, such withdrawal of the supporting roll units is then unnecessary.

At the conclusion of the operation performed on the work piece in the position 112d, Fig. 7, the next movement of the transfer bar 290 to the left, Fig. 7, in a transfer cycle as described moves the work piece to the position 112e. At this point the downward movement of the transfer bar at the end of its left-hand movement leaves the work piece supported on the fixed height supporting roll pair 164, 165, Fig. 8, there being no pivot blocks for the operation in the work position 112e. The operation consists in rotating the fly wheel by the means of the supporting roll pair, to a preferred angular position of the unbalance which was measured and angularly located while the fly wheel was in the previous position 112d, as will later be explained.

At the conclusion of the operation performed in the position 112e, Fig. 7, the next movement of the transfer bar 290 to the left, Fig. 7, in a transfer cycle as described moves the work piece to the position 112f. At this point the downward movement of the transfer bar at the end of its left-hand movement leaves the fly wheel supported on the pivot blocks 202, 203, Fig. 8, where the unbalance is measured for a correction operation and while the work piece is still in the position 112f the unbalance as thus measured is corrected in accordance with the measurement, as will be later explained.

At the conclusion of the operation performed in the position 112f, Fig. 7, the next movement of the transfer bar 290 to the left, Fig. 7, in a transfer cycle as described moves the work piece to the position 112g. At this point the downward movement of the transfer bar at the end of its left-hand movement leaves the fly wheel supported on the pivot blocks 204, 205, Fig. 8. This station 112g is utilized for inspection and acceptance, or rejection, of the finished fly wheel Before the fly wheel is again transferred to the next position any remaining unbalance is first inspected with the fly wheel supported on the pivot blocks in a first angular position where deposited by the transfer from position 112f. The supporting roll pair 166, 167 is then raised to support the fly wheel above the pivot blocks and there the support roll pair is rotated to rotate the fly wheel through an angle of 90°, the supporting rolls then being lowered to again locate the fly wheel on the pivot blocks for a second unbalance inspection. The mechanism for effecting these raising, lowering and rotational movements has been previously described and the supplemental mechanism and control of the accompanying inspection measurements will be later described.

Following the inspection operation in the 112g position, Fig. 7, the next movement of the transfer bar 290 to the left, Fig. 7, in a transfer cycle as described moves the fly wheel to the position 112h. In this position the downward movement of the transfer bar at the end of its left-hand movement leaves the fly wheel supported in the unloading carrier 149, as shown in Fig. 7.

Subsequently the fly wheel is transferred from the position 112h, Fig. 7, to the position 112i, Fig. 8, during a pivotal movement of the unloading carrier by mechanism previously described which accompanies pivotal movement of the loading carrier 148 to its full line position, Fig. 18, and which leaves both these carriers in the position corresponding to the full line position of carrier 148 in Fig. 18.

From the position 112i, Fig. 8, effected as just described, the work piece is transferred to the position 112j. This is done by a unit substantially corresponding to the unit shown in Fig. 18, but operative in the other direction, upwardly in Fig. 8, such unit and its controls being later described.

When the fly wheel arrives at the position 112j, Fig. 8, it is positioned to be picked up by a suitable conveyor, but if the fly wheel has failed to pass the inspection measurements effected while it was in the position 112g, it will here be rejected by being shoved laterally, to right or left in Fig. 8, out of zone where the conveyor would otherwise operate. The mechanism and control for such rejection will be later described.

From the foregoing it will be understood that in the machine of Figs. 7, 8, the machine is simultaneously operating on fly wheels in each of the positions 112d, 112e, 112f, 112g to effect a balanced and inspected fly wheel when the step-by-step motion has carried it through these positions and before the fly wheel is transferred from the position 112g; the rejection of the fly wheels which fail to pass the inspection in the position 112g being effected later, when the fly wheel reaches the position 112j.

To effect a transfer of any individual fly wheel through all the positions 112a to 112j shown for the machine of Figs. 7, 8, requires as many cycles of machine operation as there are positions shown, but during the time required for such cycles there is a finished and inspected fly wheel produced for each cycle.

A cycle of machine operation as just referred to includes a predetermined number of revolutions of driving shaft 115, Fig. 8, and a predetermined number of reciprocations of the actuator-timer device 123, Fig. 11. The number of timer device reciprocations per machine cycle is determined by the number of teeth on the ratchet wheel 153 thereof, the ratchet wheel completing one revolution per machine cycle. This also determines the revolutions per machine cycle of the drive shaft 115, except that the actual number of shaft revolutions is, in part, determined by the ratio of the gearing connecting the shaft to the reciprocator crank 119, Fig. 7.

The machine cycles as just mentioned are continuous, but for purposes of explanation a cycle may be assumed to start with actuator-timer unit 123 at the right in Fig. 7, and to proceed from there in a series of continuous left and right-hand actuator-timer movements, accompanied by machine movements for which the mechanism has previously been described, such movements proceeding in the following order:

The timer unit 123 moves to the left, Fig. 7. During this movement the timer cams are positioned to effect movement of slide 142, Fig. 13, to the left; whereby the supporting roll pairs 162, 163 and 166, 167, Fig. 8, are moved upwardly in Fig. 7, and both the loading carrier 148 and unloading carrier 149 are pivotally moved from the positions shown in Fig. 8 to upper horizontal positions corresponding to the full line position of the carrier 148, Fig. 18. Also, as previously explained, the upward movement of the roll pairs is accompanied by an upward movement of the supporting plate 262, Fig. 17, whereby to position the index plate 261 upwardly to later index the pattern disc occupying the A position, Figs. 8, 17.

The timer unit 123 moves to the right, Fig. 7. During this movement the timer cams are positioned to effect movement of the slide 143 to the right; whereby the supporting roll pairs just mentioned revolve the fly wheels supported thereon through an angle of 90°, and the pattern disc 63, 64 or 65, whichever is in the A position, Fig. 8, is indexed 90° on its own axis by the movement of index plate 261, Figs. 8, 17.

The timer unit 123 moves to the left, Fig. 7. During this movement the timer cams are so positioned that none of the slides are moved.

The timer unit 123 moves to the right, Fig. 7. During this movement the timer cams are positioned for the slide 142, Fig. 13, to be moved to the right; whereby the support roll pairs 162, 163 and 166, 167 move down and the loading and unloading carriers 148, 149 move back to the position shown in Fig. 7. Also the supporting plate 262 moves down, whereby to disengage the friction contact of the pattern disc index plate 261.

The timer unit 123 moves to the left, Fig. 7. During this movement the timer cams are positioned to move the slide 143, Fig. 13, to the left whereby the index mechanism for the A position pattern disc is reversely idly rotated, the index plate 261 now being in its lower position. The support roll pairs just mentioned are also reversely idly rotated while in their lower positions.

The timer unit 123 moves to the right, Fig. 7. During this movement the timer cams are positioned to move the slide 141, Fig. 13, to the right whereby the transfer bar 290, Fig. 14, is moved to the right, to the full line position there shown, and at the same time the index actuator 243, Figs. 15, 16, for the indexible disc carrier 62 reverses idly in a 120° return movement, the index disc 233 now being below the actuator.

The timer unit 123 moves to the left, Fig. 7. During this movement the timer cams are so positioned that none of the slides are moved.

The timer unit 123 moves to the right, Fig. 7. During this movement the timer cams are positioned for movement of slide 146, Fig. 13, to the right, whereby the transfer bar 290, Fig. 14, is moved upwardly while in its right-hand position there shown and the transfer blocks 291 are lifted to support the fly wheels.

The timer unit 123 moves to the left, Fig. 7. During this movement the timer cams are positioned to move the slide 145, Fig. 13, to the left, whereby all the support roll pairs 162, 163; 164, 165 and 166, 167 are withdrawn, downwardly in Fig. 8, to clear the transfer blocks 291 during subsequent left movement thereof. Also, during this movement the unitary structure which includes the pattern disc carrier 62, Figs. 8, 15, is moved upwardly in Fig. 15 whereby to engage its index disc 233 with the actuator 243.

The timer unit 123 moves to the right, Fig. 7. During this movement the timer cams are so positioned that none of the slides are moved.

The timer unit 123 moves to the left, Fig. 7. During this movement the timer cams are positioned to move the slide 147, Fig. 13, to the left, whereby the transfer bar 290, Fig. 14, while still in its upper position moves to the left to transfer the fly wheels. Also during this movement the pattern disc carrier 62, Fig. 15, which is in its upper position, is indexed 120° by movement of the index actuator 243.

The timer unit 123 moves to the right, Fig. 7. During this movement the timer cams are positioned to move the slide 145, Fig. 13, to the right whereby the several support roll pairs 162, 163, etc., are moved forward, upwardly in Fig. 8. Also during this movement the pattern disc carrier 62, Fig. 15, is dropped to disengage the index disc from the actuator 263 and for the index disc notches to engage the index locating point 250. As has been explained, this down movement of the pattern disc carrier 62 positions the friction disc 264 of the C position pattern disc, Figs. 8, 15, to engage the continuously rotating friction disc 282, and positions the corresponding disc 264 of the B position pattern disc to engage the friction disc 275 which will later be rotated from shaft 225, as will be later described.

The timer unit 123 moves to the left, Fig. 7. During this movement the timer cams are positioned to move the slide 146, Fig. 13, to the left whereby the transfer bar 290, Fig. 14, is lowered while in its left-hand position, to the left of the position there shown.

The timer unit 123 moves first right, Fig. 7, then left, then right again. In each of these movements the timer cams are so positioned that none of the slides are shifted. During these movements as well as during portions of the previous movements as will later appear various supplemental units, later described, are operating on the fly wheels and at the conclusion of the last mentioned right-hand timer movement such operations are completed. The machine has then completed a cycle of machine operations and starts another cycle, as before.

Following a transfer as described the measurement of unbalance in position 112d is effected by a measuring device such as is shown in Figs. 4, 5, and the results are recorded by automatically positioning a pattern block such as 100, Figs. 5, 8, on whichever one of the pattern discs 63, 64 or 65 then occupies the A disc position following the 120° indexing of disc carrier 62 during the transfer cycle. For effecting such measuring and the automatic positioning of the pattern block 100 there is provided a unit, such as the unit 350, Fig. 19, which includes a housing 350a fixed on the machine frame adjacent the 112d work position. The unit 350 also includes the essential measuring and control elements of an unbalance measuring device such as shown in Figs. 4, 4A, 4B, 4C, and of a control device for effecting a pattern of the unbalance forces such as shown in Figs. 5, 5A, which have been described in connection with the views mentioned and therefore need not here be explained in detail. The slide bar 60, Fig. 19, corresponds to the reciprocatory bar 60, of Fig. 5, and is similarly connected for reciprocatory movement with an arm or bar 82, which has forward and reverse movement across the pattern disc 63, 64 or 65, Fig. 8, whichever is in the A position on the carrier 62, whereby to position a shiftable pattern block 100 as explained for Fig. 5. Similarly to Fig. 5 a member 29, Fig. 19, is carried on the fly wheel for pivotal movement therewith during the measuring operation, and connected for movement of a measuring arm or pointer 38, the bar 60 being also connected for movement with a contact arm or bar 84 which effects a closed circuit between the contacts 83, 83a whereby to control forward movement of the slide 60 and of the block positioning arm 82 in accordance with the measuring movements of arm or pointer 38. In short, the unit 350 establishes on the A position pattern disc of Fig. 8, a pattern of the unbalance forces present in the fly wheel of position 112d exactly as explained in connection with Fig. 5.

Following the first unbalance measurement in the position 112d the support roll unit 162, 163, Fig. 8, is raised to its upper position, whereby to raise the work piece from the pivot blocks 200, 201, and there rotated to effect 90° rotation of the work piece while the A position pattern disc is also rotated 90°, as previously explained, and subsequently the work support rolls are returned to their lower position whereby to again support the fly wheel on the pivots for the second measurement, such supporting roll cycle being effected at suitable timing as determined by the timing unit 123, Fig. 11. Following the 90° work piece rotation cycle the unit 350 effects the second cycle of unbalance measuring and pattern block positioning movement as described for the control mechanism of Fig. 5 whereby to complete the positioning of the pattern block 100 on the A position pattern disc in accordance with the unbalance of the 112d position fly wheel, such positioning being used for control of operations in the next succeeding fly wheel position 112e. The first and second unbalance measurement and shifting of pattern member 100 effected by the unit 350 are respectively timed similarly to Fig. 5 by spaced configurations such as 90a, 99, of a timing cam 90.

The work piece is next transferred from the 112d position, Fig. 7, to the position 112e by a cycle of transfer movement timed by the timer unit 123 as previously described. In this position of the fly wheel the final lowering of the transfer bar to complete its cycle leaves the fly wheel at 112e supported on the roll pair 164, 165, this roll pair having no vertical movement, as has been stated. While the fly wheel is thus supported in the 112d position it is rotated sufficiently to bring the center of its unbalance, now patterned by the block 100 which, following the indexing of disc 62, Fig. 8, during the transfer cycle, occupies the B disc position, Fig. 8, into a preferred angular position for the correction of the unbalance. In the present machine it has been preferred to angularly position the center of the unbalance in the horizontal plane of the work axis, whereby to permit a single measurement of the unbalance moment for determining the amount of correction in an operation later described. It is to be understood, however, that the position of the pattern block 100 on the pattern disc now located in the B position on the disc carrier 62 patterns the amount as well as the angular position of the unbalance of the work piece now in position 112e, the radial distance of the center of the block from the disc axis being proportional to the amount of unbalance. Thus, if desired, the pattern could be used for determining the amount of necessary unbalance correction.

For rotation of the fly wheel to effect such positioning of the unbalance in the horizontal plane of the work axis there is provided mechanism as follows:

The shaft 225, Figs. 8, 20, is connected for rotation of the fly wheel supported from the support roll pair 164, 165, in position 112e, and for simultaneous rotation of the pattern disc 63, 64 or 65, whichever is in the B position of disc carrier 62, as previously described. The shaft is driven from a motor 354, Fig. 20, through a shaft 355, a worm 356, a worm wheel 357, a shaft 358, a pair of helical gears 359, 360, a shaft 361, a pinion 362 and a gear 363 fixed on the shaft 225. Pinion 362 is mounted in a frame or housing 364 pivoted about the axis of the shaft 358 and urged against a stop 365 by a spring 366. In such frame position the pinion 362 is in driving engagement with gear 363, but may be swung to withdraw the pinion 362 from the driving engagement by a solenoid 364a which, when energized, swings the frame against a stop 367. A thin electric contact leaf 369 is arranged adjacent the B position pattern disc, the contact leaf being extended in the direction of the disc radius and in such angular relation as will effect the desired angular positioning of the fly wheel in the operation later described. The leaf is urged upwardly by a spring 310 to its full line position defined by a stop 371 but may be moved downwardly by a solenoid 372 to its dotted line position defined by a stop 373. In its lower position the leaf may effect a closed circuit contact with the center rod 100a of the pattern block 100 which is positioned on the B position disc, the circuit including a solenoid 374 and a pressure switch 375. A cam 376 on the timing shaft 50 provides a configuration 376a for releasing a pivoted lever 377, urged to released position by a spring 378 whereby to close the pressure switch 375 and energize the solenoid 372 to effect downward movement of the leaf 369. A trifle later in the machine cycle a cam 379 on the timing shaft 50 closes a pressure switch 380, there being a suitably positioned configuration 379a on the cam for releasing a pivoted lever 381 for closing the pressure switch. Closing of pressure switch 380 energizes a solenoid 382 for closing a starting switch 383 for the motor 354, and when this switch is closed the solenoid circuit may remain closed through a switch contact 384, provided a pressure switch 385 is also closed, the switch 385 being closed only when the solenoid 364a is de-energized, whereby the frame 364 is in the position engaging pinion 362 to drive gear 363 and shaft 225. The solenoid 364a is energized through a switch 386 controlled by the solenoid 374.

When the cam 376 closes pressure switch 375 to move the contact leaf 369 downwardly, as stated, the leaf may at that time effect the closed circuit of solenoid 374 through pattern block 100, since the pattern block may stand in any angular position on the B position pattern disc, as determined by the previously described block locating operation when the pattern disc was in the A position. The arrangement and operation of the parts is such, however, that such condition can only occur when the fly wheel 112e is already in the desired angular position, whereby no present rotation of either the fly wheel or the pattern disc is required. Such rotation cannot then take place because the closing of the circuit through solenoid 374 closes the switch 386 to energize solenoid 364a whereby to disengage the pinion 362. The motor 354 will subsequently start when the pressure switch 380 is closed, but this will have no effect because of the pinion disengagement and the motor switch will almost immediately again be opened, since the configuration 379a is such that pressure switch 380 is opened after only slight further rotation of cam 379 and in the then position of the housing 364 the pressure switch 385 is open, whereby the supplemental motor switch closing circuit through switches 384, 385, is inoperative.

However, except where the leaf 369 effects a closed circuit during its downward movement, as just mentioned, the pinion 362 will be in engaged position and pressure switch 385 will be closed when the cam 379 closes the pressure switch 380 to initially start the motor 354, and the motor will then continue to run until the resulting rotation of the B position pattern disc rotates the pattern block 100 to effect the closed circuit through the leaf contact 369. The arrangement and operation of the parts is such that at this time the simultaneous rotation of the fly wheel in 112e position has brought the unbalance to the desired angular position, previously described, and the closed circuit through leaf 369 and solenoid 374 then closes switch 386, whereby to energize solenoid 364a to swing the frame 364 to the position disengaging the driving pinion 362, the resulting opening of the pressure switch 385 also de-energizing the solenoid 382 whereby stop the motor. The configuration 376a of cam 376 is such that pressure switch 375 may remain closed, whereby the contact leaf 369 remains in dotted line position, during sufficient time for a complete revolution of the B position pattern disc, but following such interval the timing cam 376 opens the pressure switch, whereby the leaf returns to its upper position, and the control mechanism is then in initial position ready for the next succeeding similar cycle of operation.

The pattern block 100 has now served its purpose for the particular work piece for which the block was adjusted to pattern position when the work piece was in position 112d, as described, and during the next succeeding machine cycle the pattern disc and block which occupied the B position in the cycle just described are returned to what may be termed an initial position indicated for the disc at C, Fig. 8. The disc is carried to the C position by the 120° index of disc carrier 62 during the next succeeding transfer cycle, such indexing accompanying a transfer cycle, as previously mentioned. The indexing also carries the pattern block against an edge 387a, Fig. 8, of a stationary stop member 387 supported above the disc carrier 62. The continuous rotation of the C position disc, effected as previously described, which is in the direction of the arrow, then carries the pattern block against a stationary sweeper arm 388, and finally positions the block in a notch 387b, where it remains until the disc is indexed to the A position, as has been previously described in connection with the diagram, Fig. 5.

The work piece is next transferred to the position 112f, Fig. 7, by a transfer movement as previously described. In this position of the fly wheel the lowering of the transfer bar at completion of the transfer cycle leaves the 112f fly wheel supported on the pivot blocks 202, 203 in the same angular position determined in the preceding station 112e, that is to say, with the unbalance w at the left in Fig. 7 and in the horizontal plane of the work axis, but at a random radius. As previously stated the unbalance moment, for a particular work piece, which acts downwardly in the position 112f, could be determined from the radial position of pattern block 100, at any time following the positioning of the block for that work piece, as previously described, that is to say, either as a supplemental step following the block positioning operation in the pattern disc A position, Fig. 8, or as a step in the operation while the pattern disc was in the B position. However, for this machine, it has been preferred to make a new measurement of the unbalance moment in the work position 112f, independently of the pattern block, and the operation of measuring such moment, followed by correction of the unbalance while the work piece is in position 112f proceeds as will now be described.

For the correction of the unbalance it is preferred in the machine here shown to remove material from the fly wheel. By reason of the position of the unbalance effected in the preceding operation cycle the material is removed at the left of the work axis in Fig. 7. As previously explained, the correction could also be made by adding material along the same radius line at the right of the work axis.

The work material removal is effected, in this instance, by a driller unit shown in Figs. 21, 22, 23. This unit is carried by the machine frame, as shown in Fig. 24, and positioned for the drill to operate at a point such as w', Fig. 7, in the radius line of the unbalance, that is to say, in this instance at the left of the work axis, Fig. 7, and in the horizontal plane of the work axis, where the unbalance was positioned during the preceding operation.

The driller unit includes a base 390, fixed with the frame of the machine. A slide 391 is guided on base 390 for reciprocatory movement parallel with the axis of a drill 392 which is carried by a drill spindle 393 rotatably carried by a non-rotatable sleeve 394, the spindle being fixed against axial movement relative to the sleeve. The sleeve 394 is guided in slide 391 for reciprocatory movement relative to the slide and parallel with the drill axis, the sleeve and drill being also bodily reciprocable with the slide. A motor 395 fixed on base 390 rotates the drill spindle through a train including gears 396, 397, a shaft 399 and gears 400, 401, the gear 401 having a hub portion 401a which is slidably keyed with the extended end of the drill spindle. The slide 391 is directly connected for reciprocatory movement relative to base 390 from a piston device 402 having a piston 402a.

The spindle sleeve 394 is connected for reciprocatory movement relative to slide 391 from a piston device 403 having a piston 403a and a piston rod 403b, the piston rod and the sleeve 394 each having suitable rack teeth engaging an idler gear 404, whereby to axially shift the drill from the piston. The depth to which the drill enters the work is determined as later explained by the angular adjustment of a depth gauge cam 405 fixed on a shaft 406, the cam being positioned for abutment by an end of the piston rod 403b. The slide 391 may be locked in position relative to the base 390 by a clamp piston device 407 having a piston 407a, and the depth cam 405 may be locked in angular position by a clamp piston device 408, having a piston 408a.

The driller unit has a cycle of operation which includes a rapid advance of the drill to contact the work surface while the drill is not rotating, followed by drilling to a depth determined by the unbalance moment, and subsequent rapid return of the drill to its withdrawn position, and during the drilling the work piece is clamped in the position 112f and supported against the thrust of the drill, as will be explained.

The unbalance measuring and correcting-cycle in the work position 112f is initiated by suitable timing means, later described, during the transfer of the fly wheel to that position. Referring to Fig. 25, an unbalance measuring device, generally similar to the device of Fig. 4, is associated with the 112f fly wheel position and since the operation of this device has been fully explained in connection with Fig. 4 it will here be only briefly described. The device includes a pivoted arm 31 operated against a stop 43 upon energizing of a solenoid 44, whereby a work contacting member 29 is moved against the work piece 112f for movement therewith during the measuring operation, there being a coil 45 for magnetizing the member 29 during the measuring. The moment of rotation of any unbalance present in the work piece operates a pointer or indicator 38 in an amount proportional to the unbalance. In the 112f position of the work piece, since the unbalance is always in the one direction from the pivots, as explained, the pointer 38 always moves in the one direction from the zero position, which is indicated by the dotted lines at 38a, Fig. 25. A slide or bar 410 having rack teeth 410a, and arranged adjacent to pointer 38, may be actuated in forward direction, to the left in the upper view, Fig. 25, from a motor 411, through a shaft 412, a worm 413, a worm wheel 414, a shaft 415, helical gears 416, 417, a shaft 418 and a pinion 419 engageable with rack 410a on the slide 410. The pinion 419 is mounted on a pivoted housing or frame 420 which may be swung about the axis of shaft 415, in the one direction by a spring 421 against a stop 422 to engage the pinion and rack, or in the other direction by a solenoid 423 against a stop 424, whereby to disengage the pinion.

The forward movement of the slide bar 410, Fig. 25, operates a position copying device to position the depth cam 405, Figs. 21, 23, of the driller unit in accordance with the unbalance indicating position of pointer 38. In the present instance the position copying device is of well known electrical type in which a primary unit such as 428, Fig. 25, includes a shaft 428a, a rotor 428b and a stator 428c, and a similar secondary unit 429 includes a shaft 429a, rotor 429b and stator 429c. The shaft of the unit 428 is connected to be rotated from the slide 410 by a gear or segment 430 engaging suitable rack teeth on the slide, and the shaft of the unit 429 is connected to the shaft 406 of drill depth cam 405 of the driller unit through a gear or segment 430 and pinion 431, as shown in Fig. 22. When the position copying units are energized from a suitable power line the rotor of the secondary unit moves to corresponding angular position, relative to the stators, with the rotor of the primary unit. It will be understood that other types of position copying devices might be used to effect the same result, including suitable forms of mechanical or hydraulic devices, not shown.

The unbalance measuring cycle of the 112f work position proceeds as follows: Referring to Fig. 25, the last portion of the work transfer cycle moves the 112f work piece downwardly, the work piece being frictionally engaged in one of the transfer blocks 291 whereby it is prevented from movement from the angular position established, as described, in the 112e work position. During such downward movement, and before the work piece is released to pivot on the blocks 202, 203, a timing cam 432 fixed on the shaft 50 and having a configuration 432a energizes solenoid 44 through release of a pivoted lever 433 operating a pressure switch 444, whereby to swing the lever 31 against the stop 43 to engage the member 29 with the fly wheel. This engagement is timed to occur while the fly wheel still engages the carrier block 291, just prior to the release of the fly wheel from the block as the block continues its downward movement. The coil 45 for magnetizing member 29 might here be energized by a timer cam and pressure switch in the manner explained for the device of Fig. 4, but it is here preferred to energize the coil through the pressure switch 444, but only after the arm 31 has contacted stop 43, the circuit of the coil being completed through the stop contact, as indicated in Fig. 25. By reason of the timing of the downward movement of member 29 its contact with the work piece precedes the contact of arm 31 with stop 43 and when coil 45 is energized the member 29 is properly positioned on the work piece. However, such energizing of the coil takes place before the fly wheel is released from its friction contact with the transfer block 291 to be free to pivot on the pivot blocks.

When continued downward movement of carrier block 291, Fig. 25, leaves the work piece free to pivot on the pivot blocks 202, 203 the pointer 38 will move from zero position indicated at 38a to a position corresponding to the unbalance moment in the work piece. A trifle later in the machine cycle a timing cam 446 having a configuration 446a releases a pivoted lever 447 to close a pressure switch 448 whereby to energize a solenoid 449 and close a starting switch 450 of the motor 411. Closing the switch 450 also closes a switch 451 which provides a holding circuit for solenoid 449 through a pressure switch 452 when switch 452 is closed. The starting of the motor, as described, starts the forward movement of slide 410 and shortly thereafter the pressure switch 452 is closed and motor 411 continues to run, although the configuration 446a of cam 446 opens switch 448 shortly after switch 452 is closed.

After motor 411 is started, as described, the slide 410 continues its forward movement until a contact is effected between a contact member 453 carried on an arm 454 of the slide and a contact member 455 carried on the unbalance measuring pointer 38, whereby to close a circuit through the solenoid 423 and disengage the pinion 419 from the slide rack 410a, whereupon the slide is returned to starting position by suitable means such as a spring 456. The circuit just mentioned is only momentary, and to maintain the pinion 419 disengaged during the slide return movement other means are provided, including a pivoted latch 457 engageable in a notch 458 by the means of a solenoid 459 against the resistance of a spring 460. The solenoid 459 is energized whenever motor switch 450 is closed, but during the forward movement of slide 410 cannot engage the notch by reason of the interfering shoulder of the notch, as shown. However, as soon as the solenoid 423 has pivoted the housing 420 to disengage pinion 419 during the return movement of slide 410 the solenoid 459 effects the notch engagement, the latch 457 then continuing to hold the housing in pinion disengaged position until the return movement of the slide is completed, as mentioned. At the completion of the slide return movement the pressure switch 452 of the holding circuit is opened, whereby to de-energize solenoid 449 and the motor switch 450, which also de-energizes the solenoid 459, permitting the spring 460 to withdraw latch 457, and the spring 421 then operates to again engage the pinion 419 with rack 410a, the parts then being positioned for starting another cycle of forward and reverse movement of slide 410 when another work piece is subsequently transferred to position 112f.

The position copying devices 428, 429, Figs. 25, 22, which, as stated, position the driller depth cam 405 in accordance with the unbalance moment measured by the measuring cycle of the 112f work position, are energized through a switch 462, Fig. 25, which may be closed by a solenoid 463, but only when slide 410 is moving in a forward direction, the circuit of the solenoid being effected through the motor starting switch and through contacts respectively on the stop 422 and on the housing 420. During forward movement of slide 410 the switch 462 is closed and the rotor of the secondary unit 429 follows the angular movement of the primary unit, but when the housing 410 is pivoted, as described, to disengage the pinion 419 at the end of the forward slide movement the solenoid 463 is de-energized and switch 462 is opened. The rotor of primary unit 428 is geared, as described, to follow both the forward and return movement of the slide but the interruption of the energizing circuit of the copying device leaves the rotor of the secondary unit 429 and driller depth cam 405, in angular position corresponding to the unbalance moment of the work piece. Following completion of the driller unit cycle, later described, but only when the actuating circuit and copying device circuit is again established at the beginning of a torque measuring cycle on the next work piece to occupy position 112f, the rotor of secondary unit 429 moves to the angular position of the rotor of primary unit 428 and then again follows the forward movement of the slide 410 until the housing 420 disengages the pinion 419, as before.

The cycle of the driller unit shown in Figs. 21, 22, 23 is initiated by a solenoid 470, Figs. 23, 25. Referring to Fig. 25 the solenoid 470 is energized by the same circuit, previously described, as the solenoid 423 and establishes the starting of the driller cycle as the point in the measuring cycle where the drill depth cam 405, Fig. 23, has been positioned and the pinion 419, Fig. 25, is disengaged for the return movement of slide 410. The energizing of solenoid 470 shifts control valves 475, 476, 477 to the left of their central position shown in Fig. 23. The circuit of solenoids 423, 470 are only temporarily closed, as previously mentioned, and the valves are yieldably retained in their left-hand position by detent mechanism such as 477a.

The valves 475, 476 control pressure fluid to operate clamping piston devices such as 478, 479, positioned adjacent the 112f position fly wheel. The clamp device 478 includes a work support 478a which may be shifted by a piston 478b to a retracted position shown in Fig. 23 where it clears the work piece during the work transfer cycle, or to a working position to the left of the position shown, where the face of the work support is positioned to act as an abutment for the work during drilling. The clamp device 479 includes a pivoted pressure equalizer bar 479a which may be shifted by a piston 479b to a retracted position shown in Fig. 23 where it clears the work transfer path, or to a working position at the right of the position shown, where the equalizer bar 479a clamps the work piece against the face of the support 478a.

The valves 475, 476 are each constantly supplied with pressure fluid, as from a pump 481, Fig. 23, which receives fluid from a reservoir 481a and may be driven, for example, from the main driving shaft 115, Fig. 8, the pressure fluid passing through an overload relief valve 481b to a supply channel 482. When the valves are shifted to the left at the start of the drilling cycle the piston devices 478, 479 are supplied with pressure fluid through the valve ports 475a, 476a respectively, and the piston devices move forward to their working positions, previously mentioned, rigidly clamping the work piece 112f in drilling position and maintaining such clamping until the valves are shifted to the right at the conclusion of the driller cycle, as later described, when pressure fluid is supplied for unclamping and retracting the devices through the valve ports 475b, 476b. The equalizer bar 479a might, unless prevented, contact and shift the work piece before the member 478a was positioned to support it and to prevent this the pressure fluid from port 476a operates through a one-way restricted orifice device 479c. The parts are timed for the clamping devices to grip the work piece before it is released from the unbalance measuring device thereby preventing angular movement of the work piece before it is clamped in drilling position.

The described left-hand movement of valve 477, Fig. 23, admits pressure fluid from the channel 482 through a port 477b to the piston device 408 which clamps the depth cam 405 in the position established by the unbalance moment measuring operation, previously described, the piston 408a remaining clamped until the valve 477 is shifted to the right at the conclusion of the drilling cycle as later described, at which time the clamp is released by a spring 484.

The left-hand movement of valve 477 also admits pressure fluid for an initial forward movement of slide 391. The slide is continuously urged in the other direction, to the left in Fig. 23, by pressure fluid acting on the smaller area end of piston 402a, but when valve 477 is positioned to the left pressure fluid is applied to the larger end of the piston through port 477b, a valve device 485 which is then in the position shown in Fig. 23, and a channel 486. The valve device 485 includes a plunger 485a urged to the left by a spring 485b, but during the right-hand position of valve 477 occurring at conclusion of the preceding driller cycle the plunger has been forced to the right to the position shown, by pressure fluid through a port 477c. When the pressure is released on port 477c by the shifting of valve 477 to the left the plunger 485a is retained in its right-hand position, except as later explained, by a pivoted spring operated dog or latch 488 and pressure fluid will then pass to piston 402 through channel 486 and effect forward movement of slide 391, as stated.

The forward movement of slide 391 to the right in Fig. 23 takes place while the drill 392 is not rotating. The drill, and its spindle sleeve 394, is continuously urged to its retracted position relative to slide 391, shown in Fig. 25, by fluid pressure from line 482 acting on the smaller area end of piston 403. The forward movement of slide 391 with the drill retracted continues until the drill strikes the fly wheel supported in position 112f and the slide cannot then travel farther. The pressure in line 486 then rises whereby to operate plunger 489a of a pressure valve 489 against the resistance of a spring 489b. At a predetermined pressure level valve plunger 489a opens a port 489c for fluid to pass from line 486 to a line 490 and thence to the piston 407a to clamp the slide 391 in whatever the position where the non-rotating drill contacts the work piece. When pressure is released in line 490 at the conclusion of the drilling, as later described, the clamp is released by a spring 491.

Simultaneously with the clamping of slide 391 the pressure fluid in channel 490 operates a piston device 492 to start the drill motor 395, Fig. 21. Referring to Figs. 21, 23, a motor starting switch 493 is urged to open position by a spring 494 but will be closed to start the motor when fluid pressure is applied to the piston device 492 as mentioned. When pressure is relieved in channel 490, as later described, the switch will again be opened to stop the motor.

Following starting of the drill motor 395 as just described, the piston device 403, Fig. 23, is operated for feeding forward the drill sleeve 394 and drill 392 relative to the clamped slide 391 as follows: A feed fluid supply pump 496, Figs. 21, 23, is fixed on support 390 to be driven by the motor 395, as for example by a gear 497 engaging the pinion 400. Pump 496 may be of any suitable type, preferably of high pressure type delivering a small volume as compared with pump 481, whereby the feed rate is relatively slow as compared with the initial forward movement and the reverse movement of the drill. Pump 496 draws fluid from a reservoir 497 and delivers fluid to the large area end of piston 403 through an adjustable relief valve 498, channel 499, a valve device 500 and a channel 501. The valve device 500 includes a plunger 500a urged by a spring 500b to a position shown in Fig. 23 where the fluid in channel 499 is returned to reservoir 497 and channel 501 also drains to the reservoir, but following the clamping of slide 391 and starting of the drill motor the pressure rises in channel 490 as described and at a predetermined pressure level the plunger 500a will be forced to the left to a position where the return flow to the reservoir is blocked and channel 499 communicates with channel 501, whereby to start the forward feed motion of the drill, to the right in Fig. 23. When pressure is relieved in channel 490 as later described the plunger returns to the position shown in Fig. 23 to again connect the channels 501 and 499 to drain to the reservoir, whereby the constant pressure on the small area of piston 403a returns the drill to the retracted position, shown in Fig. 23.

During forward feeding of the drill as just described the end of the piston rod of piston 403a will abut the depth cam 405, thereby establishing the weight of unbalance correction material removed from the work piece. When this occurs piston 403a and drill 392 can feed no further and the pressure rises in channel 501 to operate a plunger 504a of a pressure valve 504 against the resistance of a spring 504b. At a certain pressure level the movement of the plunger admits fluid to a channel 505 whereby to operate a piston device 506 to trip the latch 488.

Following tripping of the latch 488, Fig. 23, as just described, the valve plunger 485a is forced to the left of the position shown, by spring 485b. In the position of valve 485 as shown pressure fluid from line 482 through a channel 507 is cut off from a channel 508 which is then connected to a drain, but when valve 485 shifts to the left the channels 507, 508 communicate and a piston device 509 shifts valves 475, 476, 477 to the right. These valves remain in the right-hand position until again shifted to the left by solenoid 470 at the start of another driller cycle as described, but valve 485 is immediately returned to the right by pressure fluid from port 477c. However, in the new position, with both valves 477 and 485 in right-hand position the channel 486 is open to a drain through port 477b and a drain port 477d. In the meantime as later described fluid pressure has been relieved in channel 505 and on piston device 506, whereby latch 488 again retains valve member 485a in its right-hand position, whereby fluid pressure is drained from channel 508 and piston 509 will not operate to oppose the next left-hand movement of valves 475, 476, 477 when another driller cycle is initiated for the next work piece.

When channel 486 is drained, as just described, pressure is immediately relieved in channel 490 by the return of pressure valve 489 to the position shown and by drain of fluid through a oneway valve such as 510, whereby piston device 492 moves to open the drill motor switch 493, Fig. 21, also slide 391 is unclamped and valve 500 returned to the position shown in Fig. 23, draining the channel 501. Both the slide 391 and the drill are now returned to their retracted positions by the constant fluid pressure acting on pistons 402, 403. The connection of channel 501 to the drain also drains the channel 505 through a one-way valve 511, whereby spring 488a may act to return the dog 488 to the position shown. Connection of port 477b to the drain as previously described also unclamps the piston device 408 and the drill unit parts are then all in initial position for the starting of another cycle when solenoid 470 is next energized.

The driller cycle just described completes the combined cycle of determining and correcting the amount of unbalance in the work position 112f, and the work piece is next transferred by a transfer cycle as previously described to the position 112g, Fig. 7, where an operation of inspecting the work piece for any remaining unbalance is conducted to determine whether the preceding correction operations have brought the residual unbalance within the limit of tolerance established for the work piece.

In the position 112g the measuring of the remaining unbalance in the work piece for inspection purposes, in this machine, differs in no essential particular from the unbalance measuring operation previously described which is a part of the cycle for the positioning of the pattern blocks 100 on the A position pattern disc while the work piece is in position 112d. For the position 112g, the same as for the position just mentioned, the transfer cycle leaves the fly wheel supported on the pivot blocks, in this instance the blocks 204, 205, Figs. 8, 26. Then, following the first measurement of unbalance with the fly wheel so supported, the work is lifted from the pivot blocks, rotated 90° and returned to the pivot blocks for the second measuring, such movements in this instance being effected by the supporting roll pair 166, 167, Fig. 8, which are both vertically movable and rotatable for the purpose as previously described, and timed by the timer unit 123, Fig. 11. A unit 515, Fig. 26, is fixed on the machine frame adjacent to the 112g position fly wheel. This unit provides unbalance measuring mechanism the same as for the device of Fig. 4, suitably timed by the spaced configuration 516a, 516b of a cam 516 fixed on the shaft 50 for the movement of a work contact member 29, which operates the same as the member 29 of Fig. 4, to contact the position 112g fly wheel at suitable intervals for the two unbalance measurements which are required, as stated, for the inspection in work position 112g, the work contact member being magnetized, similarly to 29 of Fig. 4, at suitable intervals, here timed by spaced configurations 517a, 517b of a cam 517.

The unit 515, Fig. 26, also provides a pivoted indicator member 518 corresponding to the indicator 38 of Fig. 4 but in this instance provided with a hole or aperture such as 518a. A closed casing 519 provides an aperture 519a normally aligned with indicator aperture 518a. As long as the two apertures align light from a lamp 520, preferably of fluctuating light intensity as from an interrupted or alternating current, may pass through them to fall on a light sensitive electronic tube 521, whereby to establish a current to an amplifier 522 connected to a relay 523, and in such case line current will energize a solenoid 524 to operate a plunger 525 against the resistance of a spring 525a, thereby maintaining the plunger in a retracted position, to the right of the position shown in Fig. 26, as long as the aperture of the indicator pointer 518 aligns with the aperture of casing 521.

But, if during either of the two unbalance inspection operations on the fly wheel in position 112g, there is sufficient unbalance remaining to deflect the pointer 518 in either direction sufficiently to interrupt the beam of light to the tube 521, the current to solenoid 524 will be interrupted and plunger 525 will then move to the position shown in Fig. 26, close to a revolving disc 526. The disc 526 is revolved from the shaft 50, which revolves once per machine cycle as stated, by a pinion 527 engaging suitable gear teeth on the disc periphery, the pinion and gear being of such ratio that the disc revolves once for a plurality of cycles of machine operation. The disc 526 carries a corresponding plurality of slidable rods such as 528a, 528b fitted about the periphery at angular spacing corresponding to one machine cycle, and during each inspection cycle the plunger 525 is aligned with one of the rods 528. Interruption of current to the solenoid 524, as described, causes plunger 525 to shift the aligned rod such as 528a, Fig. 26, to the left, as shown. The rod remains in such position while the disc 526 revolves sufficiently to bring that plunger to a later position corresponding to the fly wheel position 112j, Fig. 8, which position the fly wheel now being inspected in the position 112g will then occupy.

When the fly wheel and the plunger 528a have each simultaneously reached the positions corresponding to fly wheel position 112j, the rod 128a, if it projects to the left as shown in Fig. 26, will contact a member 529 to close a circuit through a solenoid 530 whereby to close switches 531, 532. These switches initiate a cycle of forward and return movement, later described, of a slide 533 guided in a unit 534, which is suitably fixed adjacent to the 112j fly wheel position, for the forward movement of the slide to the left of the position shown in Fig. 26 to shove the fly wheel sidewise, for example, to the left of the fly wheel position 112j shown in Fig. 8, that is to say, out of the line of delivery of work from the machine, whereby any fly wheel which fails to pass the unbalance inspection does not follow through the line of delivery of properly balanced fly wheels and may be returned to the machine, if desired, for another balancing operation. Any plungers 528a, 528b, etc., which have been shifted to the left in Fig. 26 for rejection of a fly wheel, as described, are again returned during rotation of disc 526 to the central position shown for plunger 528b by stationary cams such as 535, 536.

For the forward and return movement of the rejector slide 533 the unit 534, Fig. 27, provides structure and control mechanism the same as that for the corresponding movement of slide 310, Fig. 18, previously described, the switches 531, 532 respectively corresponding in function to the cycle initiating switches 324b, 324a of Fig. 18. In this instance the vertically movable plunger 319 of Fig. 18 is unnecessary and those portions of the structure of Fig. 18 which relate solely to plunger 319 may be eliminated in the unit 534.

Following the cycle of inspection and acceptance, or rejection, of the fly wheels in the position 112g, as just described, the work pieces are transferred, by a transfer cycle timed from the timer 123, Fig. 11, as previously described, to the position 112h, Figs. 7, 27. During this transfer cycle the unloading carrier 149 stands in the position shown in Fig. 7 to receive the work piece.

Following such transfer of the fly wheel to the 112h position it is moved from the position 112h, Figs. 7, 27, to the position 112i by the movement of the unloading carrier 149 timed by the timer unit 123, Fig. 11, as previously described.

The fly wheel is next shifted to the position 112j, Figs. 8, 27, by a reciprocable slide 540 carrying a vertically movable actuator plunger 541 which moves downwardly from the position shown to engage behind the fly wheel in position 112i while slide 540 is at the end of its left-hand movement, in the position shown. The cycle of operation moves the slide to the right from the initial left-hand position shown while the actuator is engaged behind the fly wheel and at the conclusion of the right-hand movement immediately raises the plunger and returns the slide, the mechanism including a timer cam 542 fixed on the shaft 50 which operates cycle initiating switches 543, 544, these switches controlling a starting switch 545 and a reversing switch 546 for a motor 547 which drives the slide, the plunger movements being actuated by solenoids 548, 549. The mechanism and its control so nearly corresponds, except for reversal of operating direction, to that for movement of the fly wheel from position 112a to position 112b, shown in Fig. 18 and previously described, that it will be unnecessary to describe the structure and operation of the device of Fig. 27 in detail.

In the preceding description the movements and operations for a particular work piece have been followed in the order in which they occur in the machine but it will be understood as has been previously explained that such operations are simultaneously proceeding on different work pieces in each of the different work positions. A cycle of machine operations, such as has been described for each individual work position produces a balanced work piece at each cycle. Such machine cycle requires as many reciprocations of the actuator-timer device 123, Fig. 11, as there are teeth on the ratchet wheel 135, Fig. 7, which may vary according to the type of machine and the particular application of the balancing methods herein explained. Since the actuator-timer is constantly reciprocated from the drive shaft 115 it completes a machine cycle and a balanced work piece in a predetermined number of revolutions of the drive shaft, and the timer shaft 50 which carries the cams for the operation of various units and supplemental mechanism associated with the machine as described, is driven from a primary drive shaft such as 115 through any suitable gearing, not shown, which actuates shaft 50 through one revolution while the timer 123 completes one machine cycle.

In the particular form of fly wheel herein used to explain the operation of the illustrative machine the fly wheel provides bearing portions, projecting laterally outside the body of the wheel, which have been utilized for pivot points in various of the transfer positions. Not all work pieces provide such bearing projections, but where they are not present there is an axial bore or recess in the work which may be used to engage a work support such as an arbor providing end pivot points similar to those utilized in the illustrative machine. In such case, in the machine here shown, the supplemental arbors or devices providing pivots may be assembled with the work piece while in the positions 112a or 112b, Figs. 8, 18, and disassembled from the work piece while in the positions 112i or 112j, Figs. 8, 27, either manually or automatically, but since mechanism for such automatic disassembling and reassembling is well known in the machine tool art and more or less obvious as to the particular form required for this machine it is not here shown. It will be understood that where the balancing proceeds with the work piece axis vertical, as explained for Fig. 2 and as later referred to, such supplemental arbors or supports providing pivots will not be required, there being provided instead suitable centering devices of any suitable well known form for centering the work axis on the support, such as support 22 of Fig. 2, on which the work piece is carried while the unbalance measuring or similar operation is performed.

It will be understood that, although the machine described effects the balancing operations with the work axis horizontal, as in the device of Fig. 4, the principles and methods herein explained may be used with the work axis vertical, as in the device of Fig. 2, this being merely a matter of preference, or of selection to suit the nature and form of the work piece. Also that, for either such type of balancing the number of work transfer positions may, if desired, be reduced from that of the illustrative machine here shown, with certain attendant savings in floor space and initial cost of the machine for work pieces where this is desirable. Thus, for example, the unbalance measurements and unbalance pattern effected in the work position 112d might be directly used for correction of unbalance, without the further semi-duplicative measurement here effected in the position 112f, as has been explained. Such method would make it unnecessary to rotate the work in the manner here done in the 112e position, which is partly for the purpose of weighing of the unbalance during the drilling operation in position 112f. The work rotation of the position 112e could be dispensed with and this position eliminated if the drilling operation utilized the position 112d determination of unbalance for determining the depth of drilling in manner otherwise as herein described provided the driller unit were constructed to be rotated to the angular position of the unbalance in the work piece, instead of rotating the work piece, as in the 112e position, to the fixed angular position of the drill. The drill unit may obviously be rotated to angular position determined by the unbalance pattern by any suitable modification of structure, using the same principles of control of angular position as have been explained for rotation of the fly wheel in the position 112e.

It may be stated, however, that where a reduction in the number of operating stations is desirable, it may be desirable or necessary to simultaneously set up two patterns of the original unbalance, each in a manner similar to the method here disclosed, respectively for the control of the subsequent correspondingly angular positioning of the unbalance correction means relative to the unbalance, and for the control of the amount of unbalance correction effected. The structure required for such modified control and its operating relationship will be apparent from previous explanation of the structure and operation of the machine disclosed and therefore is not here shown.

It has been previously pointed out that only the work positions 112d to 112g inclusive are concerned in the unbalance determination and correction, including inspection. It will now be apparent that, except for inspection, the balancing methods herein disclosed could be effected, with the work piece axis either horizontal or vertical, in two positions of the work piece respectively for the operations and methods herein described for the work positions 112d, 112f, that is to say with the unbalance determined and the pattern or patterns of unbalance set up while the work piece is in a first transfer position, and the unbalance corrected in accordance with a pattern while the work piece is in a second transfer position.

In Fig. 28 there is shown still another example of a manner of unbalance determination for which the correction methods and structure herein shown, or their equivalents, are well adapted. In Fig. 28 supporting pivot members 550, 551 permit tilting movement of a work piece 552 at any angle about the vertical line of the pivot point. A measuring or indicator arm 553 is yieldably urged to a zero position corresponding to the vertical pivot axis by springs such as 554a, 554b, but if unbalance is present in the work piece the pointer will move in an angular direction and to an extent respectively corresponding to the direction and moment of the unbalance. A suitable modification of the specific unbalance correction methods and devices of the machine herein shown, such as will be obvious from previous explanation thereof, will permit of measurement of the amount and angular direction of the deflection of the pointer 553, as for example by providing the pointer with an electric contact 553a and first setting up a rotary movement of a complementary electric contact, not shown, about the vertical pivot axis whereby to complete a circuit at a point locating the angular direction of the pointer deflection and thereby locating the angular direction of the unbalance from the vertical axis; and subsequently moving a second complementary electric contact in the radial direction from the vertical pivot axis as thus determined, whereby to complete a circuit at a point determining the amount of the unbalance.

What is claimed is:

1. In a machine for reducing unbalance about the intended axis of rotation of a work piece, the combination of means for supporting the work piece in a plurality of spaced positions, means for transfer of the work piece in a step-by-step progress from a first of said spaced positions to each of the others thereof, means for establishing the relative angular position of said work piece in accordance with the angular position of any unbalance in the work piece while the work piece is supported by the supporting means in one of said positions, and unbalance reducing means operatively associated with the last mentioned position.

2. In a machine for reducing unbalance about the intended axis of rotation of a work piece, the combination of means for supporting the work piece in a plurality of spaced positions, means for transfer of the work piece in a step-by-step progress from a first of said spaced positions to each of the others thereof, means for establishing the relative angular position of the work piece in accordance with the angular position of any unbalance in the work piece while the work piece is supported by the supporting means in one of said positions, unbalance reducing means operatively associated with the last mentioned position, and means timing the operation of said unbalance reducing means in accordance with the operation of said transfer means.

3. In a machine for reducing unbalance about the intended axis of rotation of a work piece, the combination of means for supporting the work piece in a plurality of spaced positions, means for transfer of the work piece in a step-by-step progress from a first of said spaced positions to each of the others thereof, means for establishing the relative angular position of said work piece in accordance with the angular position of any unbalance in the work piece while the work piece is supported by the supporting means in one of said positions, unbalance reducing means operatively associated with the last mentioned position, and an unbalance inspection means operatively associated with one of said positions to which the work piece is transferred by said transfer means from said last mentioned position.

4. In a machine for reducing unbalance about the intended axis of rotation of a work piece, the combination of means for supporting the work piece in a plurality of spaced positions, means for transfer of the work piece in a step-by-step progress from a first of said spaced positions to each of the others thereof, means for establishing the relative angular position of the work piece in accordance with the angular position of any unbalance in the work piece while the work piece is supported by the supporting means in one of said positions, unbalance reducing means operatively associated with the last mentioned position, an unbalance inspection means operatively associated with the one of said positions to which the work piece is transferred by said transfer means from said last mentioned position, and means relatively timing the operation of said unbalance reducing means, said inspection means and said transfer means.

5. In a machine for reducing unbalance about the intended axis of rotation of a work piece, the combination of means for supporting the work piece in different positions of a plurality of spaced positions, means for transfer of the work piece in a step-by-step progress from a first of said spaced positions to each of the others thereof, means for individually determining for the work piece the angular position and the amount of any unbalance about the axis thereof during said progress of the work piece, unbalance reducing means for individual operation on each work piece during said progress including a member adjustable for determining the amount of reduction effected, control means for operation of said unbalance reducing means for the work piece at an angular position determined for that work piece by said angular position determining means, and an operative connection from said determining means for adjustment of said member in automatic accordance with the amount of unbalance determined by said determining means.

6. In a machine for reducing unbalance about the intended axis of rotation of a work piece, the combination of means for supporting the work piece in a plurality of spaced positions, means for transfer of the work piece in a step-by-step progress from a first of said spaced positions to each of the others thereof, means for individually determining for the work piece the angular position of any unbalance about the axis thereof during said progress, unbalance reducing means for individual operation on the work piece during said progress, control means for operation of said unbalance reducing means for the work piece at an angular position determined for the work piece by said angular position determining means, and timing means determinative of the relative time of operation of said transfer means, said angular position determining means and said unbalance reducing means.

7. In a machine for reducing unbalance about the intended axis of rotation of a work piece, the combination of means for supporting the work piece in a plurality of spaced positions, means for transfer of the work piece in a step-by-step progress from a first of said spaced positions to each of the others thereof, means for determining the angular position of any unbalance in the work piece about the axis thereof during said progress, unbalance reducing means for operation on the work piece during said progress, control means for operation of said unbalance reducing means at an angular position on the work piece determined by said angular position determining means, means determining the amount of unbalance in the work piece during said progress thereof, control means determining the extent of operation of said unbalance reducing means on the work piece in accordance with the amount of unbalance determined for the work piece by said amount determining means, and timing means determinative of the relative time of operation of each of said means.

8. In a machine for reducing unbalance about the intended axis of rotation of a work piece, the combination of means for supporting work pieces in a plurality of spaced positions, means for transfer of a plurality of work pieces one after another in a step-by-step progress from a first of said spaced positions to each of the others thereof, means for establishing the angular position of each work piece while in one of said positions in accordance with the angular position of any unbalance in the work piece, unbalance reducing means operatively associated with the last mentioned position, and unbalance inspection means associated with one of said work piece positions for operation on each work piece subsequent to the operation of said unbalance reducing means.

9. In a machine for reducing unbalance about the intended axis of rotation of a work piece, the combination of means for supporting work pieces in a plurality of spaced positions, means for transfer of a plurality of work pieces one after another in a step-by-step progress from a first of said spaced positions to each of the others thereof, means for determining the angular position of any unbalance in each work piece about the axis thereof during said progress, unbalance reducing means for operation on each work piece during said progress, control means for operation of said unbalance reducing means at an angular position on each work piece determined by said angular position determining means, means determining the amount of unbalance in each work piece during said progress, control means determining the extent of operation of said unbalance reducing means on each work piece in accordance with the amount of unbalance determined for that work piece by said amount determining means, and unbalance inspection means associated with one of said work piece positions for operation on each work piece during said progress subsequent to the operation of said unbalance reducing means.

10. In a machine for reducing unbalance about the intended axis of rotation of a work piece, the combination of means for supporting the work piece in a plurality of spaced positions, means for transfer of said work piece in a step-by-step progress from a first of said spaced positions to each of the others thereof, a control pattern device, means for establishing in said device a control pattern of the angular position of any unbalance in the work piece during said progress, and unbalance reducing means controlled at least in part from said pattern device to effect unbalance reduction on the unbalanced work piece at the angle of the unbalance therein.

11. In a machine for reducing unbalance about the intended axis of rotation of a work piece, the combination of means for supporting the work piece in a plurality of spaced positions, a control pattern device, means for establishing in said device a control pattern of some of the characteristics of any unbalance in the work piece, and unbalance reducing means controlled at least in part from said control pattern device for operation on the work piece in accordance with its individual control pattern established by the device.

12. In a machine for reducing unbalance about the intended axis of rotation of a work piece, the combination of means for supporting the work piece in different spaced positions, a control pattern device, means associated with some of said positions for establishing in said device a control pattern of some of the characteristics of any unbalance in the work piece, and unbalance reducing means controlled at least in part from said control pattern device for operation on the work piece in accordance with its individual control pattern established by the device while the work piece is supported in another of said positions.

13. An unbalance correction machine including a plurality of spaced work piece supporting devices, a transfer means for movement of a work piece in a step-by-step progress through said devices, means associated with said devices for measuring the unbalance of a work piece, means associated with said devices for positioning the work piece in a preferred angular position for correction of unbalance, means associated with said devices for correcting any unbalance present in the work piece, and means timing the operation of each of the other means to operate on the work piece during said progress in the order recited.

14. An unbalance correction machine including a plurality of spaced work piece supporting devices, a transfer device for movement of a work piece in a step-by-step progress through said devices, means associated with said devices for measuring the unbalance of the work piece during said progress, means associated with said devices for positioning the work piece during said progress in a preferred angular position for correction of unbalance, means associated with said devices for reducing any unbalance present in the work piece during said progress, means associated with said devices for inspecting the work piece for unbalance during said progress, and means timing the operation of the other means to operate during said progress in the order recited.

15. An unbalance correction machine including a plurality of spaced work piece supporting devices, a means associated with said devices for measuring the unbalance of a work piece supported therein, means associated with said devices for positioning a work piece supported therein in a preferred angular position for correction of unbalance, means associated with said devices for reducing the amount of unbalance of a work piece supported therein, and control means operative from said unbalance measuring means for controlling the operation of both said angular positioning means and said unbalance reducing means.

16. In a machine for correction of unbalance about the intended axis of rotation of a work piece, the combination of a device for individually determining the moment of unbalance of the work piece about said axis, a device for individually altering the unbalance in the work piece about said axis, means for establishing a preferred angular position about said axis for the work piece relative to said unbalance altering device, and an operative interconnection between said devices for the control of the amount of unbalance alteration effected by said altering device in automatic accordance with the unbalance moment determined for the work piece by said moment determining device.

17. In a balancing machine for correction of unbalance about the intended axis of rotation of a work piece, the combination of a device for determining the moment of unbalance of the work piece about said axis, a device for determining the angle of unbalance of the work piece about said axis, a device for altering the unbalance of the work piece about said axis, means establishing a preferred angular position of the work piece relative to said altering device in automatic accordance with the unbalance angle determined for the work piece by said angle determining device, and an operative interconnection for the control of the amount of unbalance alteration effected by said altering device in automatic accordance with the unbalance moment determined by said moment determining device.

18. In a machine for inspecting the unbalance of a work piece about an intended axis of rotation thereof, the combination of means for measuring the unbalance about said axis, a device operable for positioning work pieces alternatively in acceptance and rejection positions, and means interconnecting said measuring means and positioning device for effecting the one or the other of said work piece positions in automatic accordance with the measurement of unbalance effected by said measuring means.

19. In a machine for inspecting the unbalance of a work piece about an intended axis of rotation thereof, the combination of means for transfer of work pieces one after another from a preliminary position to an unbalance measuring position, unbalance measuring means associated with said measuring position, another transfer means for shifting the work pieces one after another from said measuring position alternatively to an acceptance or rejection position, means interconnecting said measuring means and the last mentioned transfer means for effecting the one or the other of said acceptance or rejection positions in automatic accordance with the measurement of unbalance effected by said measuring means, and means timing the relative time of operation of each of said transfer means and of said measuring means.

20. In a machine for reducing unbalance about the intended axis of rotation of a work piece, the combination of a device for determining the angle of any unbalance about said axis, an unbalance correction device, a device for positioning said work piece in a preferred angular position relative to said correction device in automatic accordance with the determination of the unbalance angle effected by said determining device, a device for measuring a moment of the unbalance about said axis, a device controlling the amount of unbalance correction effected by said correction device in automatic accordance with the measurement of unbalance moment effected by said measuring device, transfer means for movement of said work piece to different positions respectively associated with different of said devices, and timing means controlling the relative timing of the operation of each of said devices and said transfer means.

21. An unbalance reducing machine as recited in claim 20 in which the device for determining the angle of the unbalance includes a pattern device adjustable in automatic accordance with the unbalance angle, the machine also including a control connection operatively connecting the positioning device for operation at least in part in automatic accordance with the adjustment of said pattern device.

22. In a machine for reducing unbalance about the intended axis of rotation of a work piece, the combination of a control pattern device including a member bodily adjustable in a plane providing a point corresponding to said work axis, means for successively measuring different moments of unbalance in the work piece respectively in different angular positions of the work piece, and means for adjustment of said bodily movable member successively to different positions relative to said point respectively in automatic accordance with the different moment measurements effected by said moment measuring means.

WILLIAM BARTON EDDISON.